United States Patent
Liu et al.

(10) Patent No.: US 12,489,560 B2
(45) Date of Patent: Dec. 2, 2025

(54) PACKET ENCODING BASED ON RAPTOR CODES TO ENABLE ADAPTIVE PHYSICAL LAYER ERROR RATE DETERMINATION OR SELECTION

(71) Applicant: QUALCOMM Incorporated, San Diego, CA (US)

(72) Inventors: Kangqi Liu, San Diego, CA (US); Changlong Xu, Beijing (CN); Liangming Wu, Beijing (CN); Jian Li, Shanghai (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 17/996,072

(22) PCT Filed: Apr. 24, 2020

(86) PCT No.: PCT/CN2020/086808
§ 371 (c)(1),
(2) Date: Oct. 12, 2022

(87) PCT Pub. No.: WO2021/212507
PCT Pub. Date: Oct. 28, 2021

(65) Prior Publication Data
US 2023/0198668 A1    Jun. 22, 2023

(51) Int. Cl.
*H04B 7/00*    (2006.01)
*H04L 1/00*    (2006.01)

(52) U.S. Cl.
CPC .......... *H04L 1/0064* (2013.01); *H04L 1/0041* (2013.01); *H04L 1/0046* (2013.01)

(58) Field of Classification Search
CPC .... H04L 1/0064; H04L 1/0041; H04L 1/0046
(Continued)

(56) References Cited

U.S. PATENT DOCUMENTS

| | | |
|---|---|---|
| 2010/0260266 A1 | 10/2010 | Gholmieh et al. |
| 2012/0117446 A1 | 5/2012 | Taghavi Nasrabadi et al. |
| 2015/0078460 A1 | 3/2015 | Hu et al. |

FOREIGN PATENT DOCUMENTS

| | | |
|---|---|---|
| CN | 101742413 A | 6/2010 |
| CN | 102394731 A | 3/2012 |

(Continued)

OTHER PUBLICATIONS

Enensys: "Introduction of HLS in the SA Profiles", 3GPP TSG-SA4 Meeting #107, S4-AHI925, Wroclaw, Poland, Jan. 20-24, 2020, 16 Pages, Section 2.

(Continued)

*Primary Examiner* — Temica M Beamer
(74) *Attorney, Agent, or Firm* — Paul M. McAdams; Norton Rose Fulbright US LLP

(57) ABSTRACT

In one aspect of the disclosure, a method of wireless communication performed by a receiving device includes receiving, from a transmitting device, a plurality of encoded packets each including at least one respective physical (PHY) layer symbol. The method includes decoding the plurality of encoded packets based on a raptor code to generate received data. The method also includes determining a signal-to-interference-plus-noise ratio (SINR) associated with receiving the plurality of encoded packets, receiving an indication from the transmitting device, or determining a channel quality indicator (CQI) or a modulation and coding scheme (MCS) associated with receiving the plurality of encoded packets. The method further includes adaptively determining a PHY packet error rate associated with the plurality of encoded packets based on the SINR, the indication, the CQI, or the MCS. Other aspects and features are also claimed and described.

84 Claims, 7 Drawing Sheets

(58) Field of Classification Search
USPC .......................................................... 370/310
See application file for complete search history.

(56) References Cited

FOREIGN PATENT DOCUMENTS

| CN | 110663206 A | 1/2020 |
|---|---|---|
| WO | WO-2018206073 A1 | 11/2018 |
| WO | WO-2019162592 A1 | 8/2019 |

OTHER PUBLICATIONS

International Search Report and Written Opinion—PCT/CN2020/086808—ISA/EPO—Jan. 28, 2021.
Sgardoni V., et al., "Raptor Code-aware Link Adaptation for Spectrally Efficient Unicast Video Streaming over Mobile Broadband Networks", IEEE Transactions on Mobile Computing, IEEE Service Center, Los Alamitos, CA, US, vol. 14, No. 2, Feb. 1, 2015, pp. 401-415, XP011568619, the whole document.
Supplementary European Search Report—EP20932804—Search Authority—Munich—Dec. 22, 2023.

PACKET ENCODING BASED ON RAPTOR CODES TO ENABLE ADAPTIVE PHYSICAL LAYER ERROR RATE DETERMINATION OR SELECTION

TECHNICAL FIELD

Aspects of the present disclosure relate generally to wireless communication systems, and more particularly, to techniques associated with encoding and decoding packets based on raptor codes.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Data may be encoded prior to transmission within a wireless communication system to secure the data, to enable error identification or correction at a receiving device, or for other reasons. Different encoding schemes may utilize different codes. For example, some encoding schemes utilize fountain codes. Fountain codes are rateless codes with generator matrices that may have an unlimited number of columns. For example, a transmitting device may apply a generator matrix having an unlimited number of columns to source packets of data to generate encoded packets for transmission to a receiving device. The receiving device may receive the encoded packets, combine the received packets to generate a matrix, and apply the matrix to the received packets to decode the received packets. One class of fountain codes are Luby transform (LT) codes.

Another type of code used to encode data for transmission in wireless communication systems is a raptor code. A raptor code is similar to an LT code, but has reduced encoding and decoding complexities compared to an LT code due to a reduced average degree associated with the raptor code. A raptor encoding process may include a pre-coding process in which redundant symbols are generated, including low density parity check (LDPC) symbols and half symbols. The source packets and the redundant symbols may then be encoded using the same process as that used for an LT code. The result of the encoding is that the number of encoded packets is greater than the number of source packets of the original data. A benefit of using a raptor code is that only a subset of the encoded packets need to be received by the receiving device to decode the encoded packets. For example, if the receiving device successfully receives a number of encoded packets equal to the number of source packets, the receiving device is able to decode the received packets.

Current 5G NR standard protocols mandate that, in the radio link control (RLC) layer, each packet that is received by a receiving device is to be acknowledged to a transmitting device by transmission of an acknowledgement (ACK). If a packet is not successfully received, the receiving device is to transmit a negative acknowledgement (NACK) to cause the transmitting device to retransmit the unsuccessfully received packet before continuing transmission of other packets. Such an "ACK/NACK" scheme does not generally take advantage of the benefits of some encoding schemes. Additionally, the current 5G NR standard protocols mandate that devices maintain a fixed value for a physical (PHY) layer packet error rate associated with communicating packets. Maintaining a fixed PHY layer packet error rate constrains the coding rate and modulation order used for communicating the packets.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a receiving device. The method includes receiving, from a transmitting device, a plurality of encoded packets each including at least one respective physical (PHY) layer symbol. The method includes decoding the plurality of encoded packets based on a raptor code to generate received data. The method also includes determining a signal-to-interference-plus-noise ratio (SINR) associated with receiving the plurality of encoded packets, receiving an indication from the transmitting device, or determining a channel quality indicator (CQI) or a modulation and coding scheme (MCS) associated with receiving the plurality of encoded packets. The method further includes adaptively determining a PHY packet error rate associated with the plurality of encoded packets based on the SINR, the indication, the CQI, or the MCS.

Another innovative aspect of the subject matter described in this disclosure can be implemented in a receiving device. The receiving device includes at least one processor and a memory coupled with the at least one processor and storing processor-readable instructions that, when executed by the at least one processor, is configured to receive, from a transmitting device, a plurality of encoded packets each including at least one respective PHY layer symbol. The at least one processor is configured to decode the plurality of encoded packets based on a raptor code to generate received data. The at least one processor is also configured to determine a SINR associated with receiving the plurality of encoded packets, receive an indication from the transmitting device, or determine a CQI or a MCS associated with receiving the plurality of encoded packets. The at least one processor is further configured to adaptively determine a PHY packet error rate associated with the plurality of encoded packets based on the SINR, the indication, the CQI, or the MCS.

Another innovative aspect of the subject matter described in this disclosure can be implemented in an apparatus configured for wireless communication. The apparatus includes means for receiving, from a transmitting device, a plurality of encoded packets each including at least one respective PHY layer symbol. The apparatus includes means for decoding the plurality of encoded packets based on a raptor code to generate received data. The apparatus also includes means for determining a SINR associated with receiving the plurality of encoded packets, receiving an indication from the transmitting device, or determining a CQI or a MCS associated with receiving the plurality of encoded packets. The apparatus further includes means for adaptively determining a PHY packet error rate associated with the plurality of encoded packets based on the SINR, the indication, the CQI, or the MCS.

Another innovative aspect of the subject matter described in this disclosure can be implemented in a non-transitory computer-readable medium storing instructions that, when executed by a processor, cause the processor to perform operations including receiving, from a transmitting device, a plurality of encoded packets each including at least one respective PHY layer symbol. The operations include decoding the plurality of encoded packets based on a raptor code to generate received data. The operations also include determining a SINR associated with receiving the plurality of encoded packets, receiving an indication from the transmitting device, or determining a CQI or a MCS associated with receiving the plurality of encoded packets. The operations further include adaptively determining a PHY packet error rate associated with the plurality of encoded packets based on the SINR, the indication, the CQI, or the MCS.

Another innovative aspect of the subject matter described in this disclosure can be implemented in a method of wireless communication performed by a transmitting device. The method includes encoding data based on a raptor code to generate a plurality of encoded packets each including at least one respective PHY layer symbol. The method includes transmitting, to a receiving device, the plurality of encoded packets. The method also includes determining a SINR associated with transmitting the plurality of encoded packets, receiving a CQI from the receiving device, or determining a MCS associated with transmitting the plurality of encoded packets. The method further includes adaptively determining a PHY packet error rate associated with the plurality of encoded packets based on the SINR, the CQI, or the MCS.

Another innovative aspect of the subject matter described in this disclosure can be implemented in a transmitting device. The transmitting device includes at least one processor and a memory coupled with the at least one processor and storing processor-readable code that, when executed by the processor, is configured to encode data based on a raptor code to generate a plurality of encoded packets each including at least one respective PHY layer symbol. The at least one processor is configured to initiate transmission, to a receiving device, of the plurality of encoded packets. The at least one processor is also configured to determine a SINR associated with transmitting the plurality of encoded packets, receive a CQI from the receiving device, or determine a MCS associated with transmitting the plurality of encoded packets. The at least one processor is further configured to adaptively determine a PHY packet error rate associated with the plurality of encoded packets based on the SINR, the CQI, or the MCS.

Another innovative aspect of the subject matter described in this disclosure can be implemented in an apparatus configured for wireless communication. The apparatus includes means for encoding data based on a raptor code to generate a plurality of encoded packets each including at least one respective PHY layer symbol. The apparatus includes means for transmitting, to a receiving device, the plurality of encoded packets. The apparatus also includes means for determining a SINR associated with transmitting the plurality of encoded packets, receiving a CQI from the receiving device, or determining a MCS associated with transmitting the plurality of encoded packets. The apparatus further includes means for adaptively determining a PHY packet error rate associated with the plurality of encoded packets based on the SINR, the CQI, or the MCS.

Another innovative aspect of the subject matter described in this disclosure can be implemented in a non-transitory computer-readable medium storing instructions that, when executed by a processor, cause the processor to perform operations including encoding data based on a raptor code to generate a plurality of encoded packets each including at least one respective PHY layer symbol. The operations include initiating transmission, to a receiving device, of the plurality of encoded packets. The operations also include determining a SINR associated with transmitting the plurality of encoded packets, receiving a CQI from the receiving device, or determining a MCS associated with transmitting the plurality of encoded packets. The operations further include adaptively determining a PHY packet error rate associated with the plurality of encoded packets based on the SINR, the CQI, or the MCS.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow diagram illustrating an example process that supports adaptive determination of PHY packet error rates according to some aspects.

Like reference numbers and designations in the various drawings indicate like elements.

DETAILED DESCRIPTION

Figure 1:
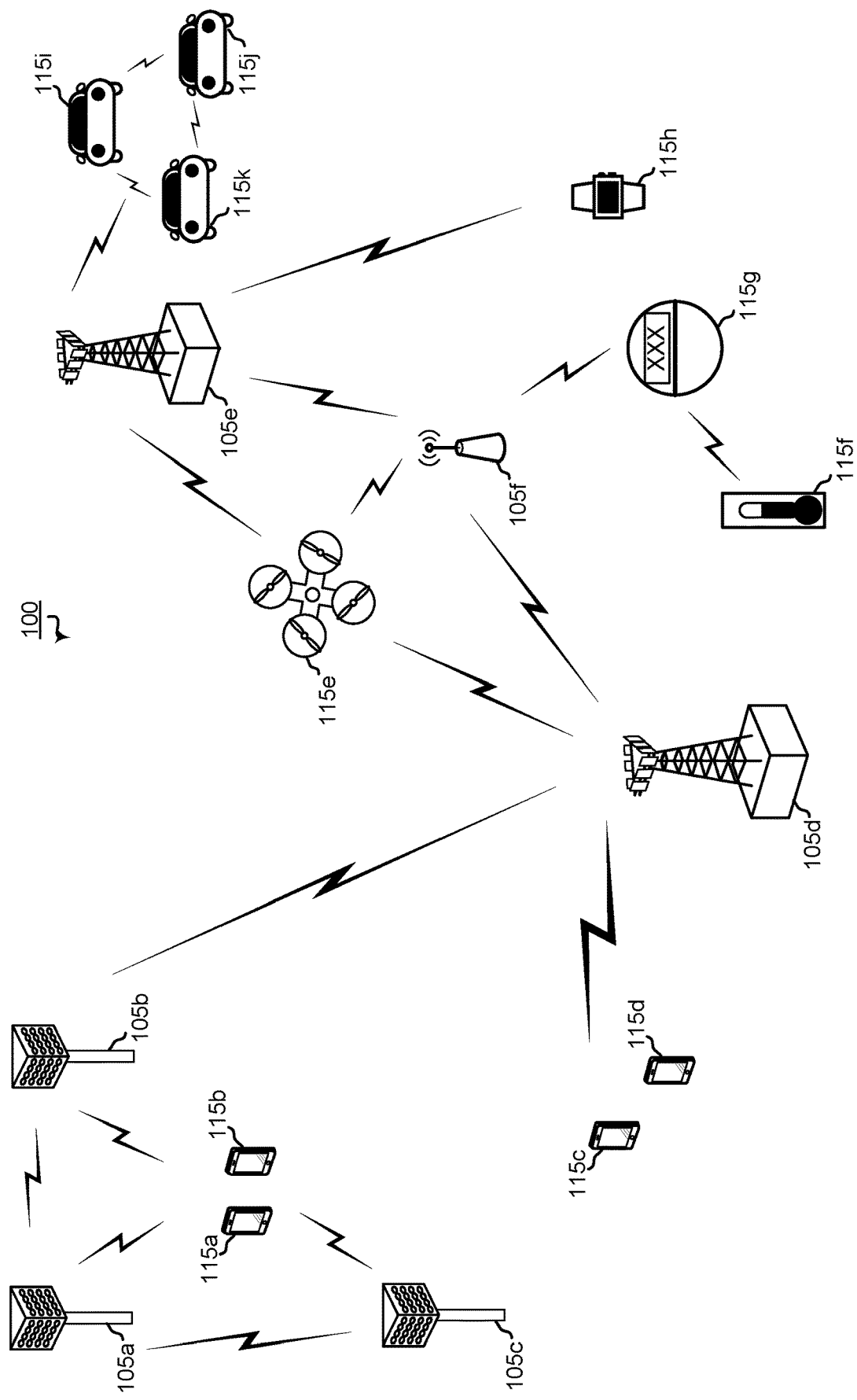
FIG. 1 is a block diagram illustrating details of an example wireless communication system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for supporting adaptive determination of physical (PHY) packet error rates at devices of a wireless communication system. Such adaptive determination of PHY packet error rates may be supported through the use of a raptor code to encode and decode packets communicated within the wireless communication system. To illustrate, a transmitting device, such as a base station (or a user equipment (UE)), may encode data based on a raptor code to generate a set of encoded packets. In some aspects, the raptor code may be applied at the radio link control (RLC) level. For example, the transmitting device may partition the data into multiple source packets and convert the source packets to the RLC level. The transmitting device may then encode the source packets at the RLC layer based on the raptor code to generate multiple RLC-encoded packets. The transmitting device may then convert each of the RLC-encoded packets into one or more PHY layer symbols via another encoding operation (for example, using an error-correction encoding scheme such as low density parity check (LDPC) encoding). The transmitting device may then transmit the PHY layer-encoded packets (in the form of the PHY layer symbols) to a receiving device, such as a UE (or a base station), via one or more wireless networks.

A device that successfully receives the set of encoded packets (the PHY layer-encoded packets), or at least a subset of the encoded packets, may decode all of the encoded packets in the set based on the same raptor code as that used by the transmitting device to encode the packets. For example, the receiving device may successfully decode the set of received packets by performing a decoding operation (for example, using the same error correcting scheme, such as LDPC decoding, as used by the transmitting device) on the PHY layer symbols to generate RLC-encoded packets. The receiving device may then decode the RLC-encoded packets based on the raptor code.

The receiving device may also perform one or more operations to enable adaptive determination of a PHY packet error rate associated with the raptor-based encoding. For example, the receiving device may determine a signal-to-interference-plus-noise ratio (SINR) associated with receiving the encoded packets, a channel quality indicator (CQI) associated with receiving the encoded packets, or a modulation and coding scheme (MCS) associated with receiving the encoded packets. Alternatively, the receiving device may receive an indication of the PHY packet error rate from the transmitting device. The receiving device may adaptively determine the PHY packet error rate based on the SINR, the CQI or MCS, or the indication. "Adaptively determining" the PHY packet error rate may include identifying, or selecting, the PHY packet error rate "on the fly," such as during decoding or processing of the set of encoded packets. For example, the receiving device may determine a particular PHY packet error rate that corresponds to the SINR, the CQI, or the MCS, as indicated by predetermined configuration data. As another example, the transmitting device may set the PHY packet error rate and transmit an indication of the PHY packet error rate to the receiving device. As similarly described with reference to the receiving device, the transmitting device may determine the PHY packet error rate based on a SINR determined by the transmitting device, a CQI received from the receiving device, or a MCS determined by the transmitting device.

Particular implementations of the subject matter described in this disclosure can be implemented to realize one or more of the following potential advantages. In some aspects, the present disclosure provides techniques for adaptively selecting and determining a PHY packet error rate of a set of encoded packets. In this way, a PHY packet error rate may be used that is less than (or greater than) a fixed PHY packet error rate that is maintained by other wireless communication devices. Because a coding rate and a modulation order used to encode the set of encoded packets are based on the PHY packet error rate, adjusting a PHY packet error rate may enable greater coding rates, greater modulation orders, or both, to be used as compared to maintaining a fixed PHY packet error rate. Additionally, using the raptor code to encode and decode the set of RLC-encoded packets enables a receiving device to decode the source data using only a subset of the plurality of encoded packets. Because unsuccessfully receiving one or more packets does not prevent the receiving device from decoding the source data, an acknowledgement/negative acknowledgement (ACK/NACK)

scheme may not be implemented, which reduces overhead and may increase the available system bandwidth.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
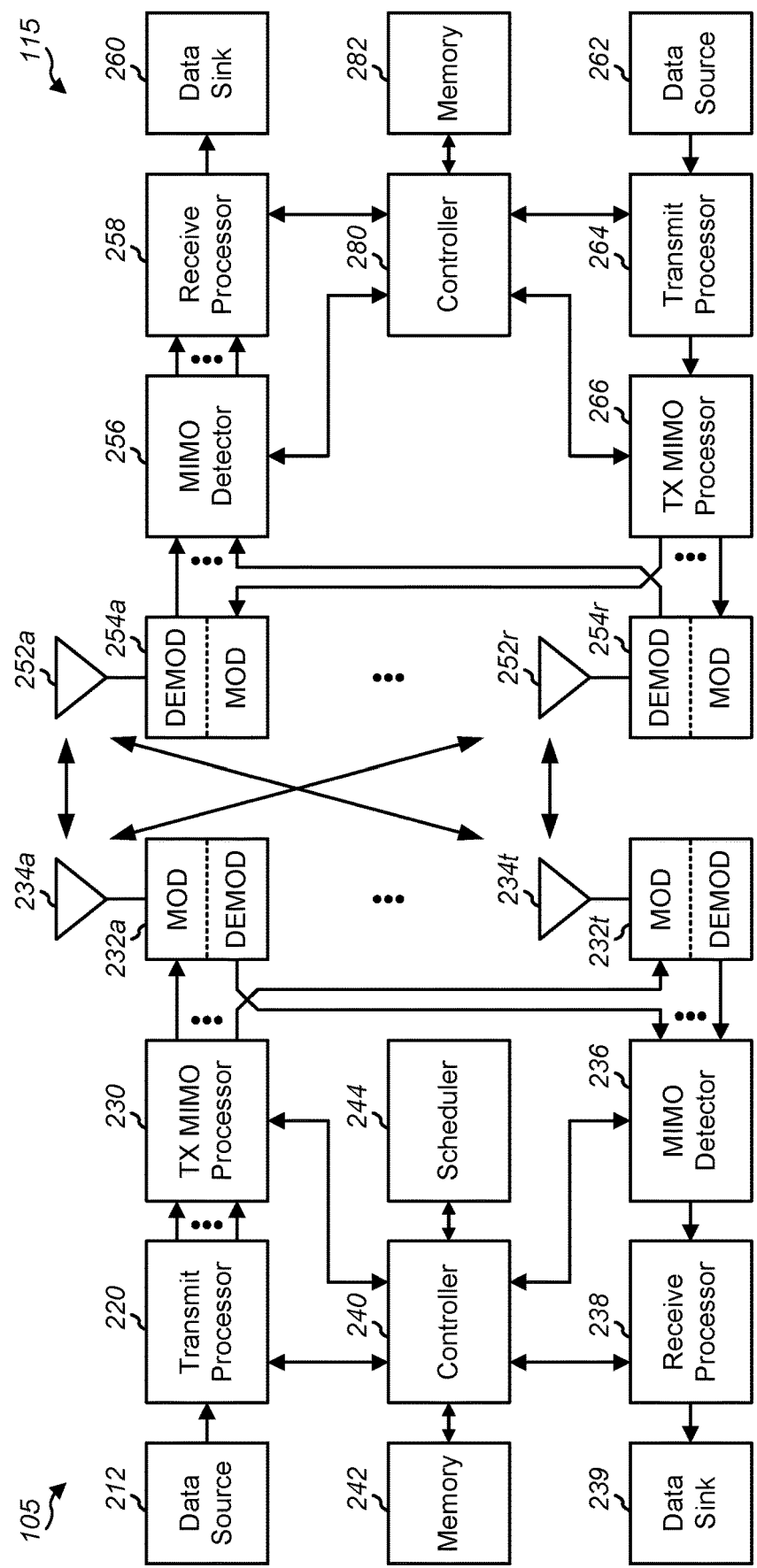
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 3-6, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

The present disclosure provides systems, apparatus, methods, and computer-readable media for supporting adaptive determination of physical (PHY) packet error rates at devices of a wireless communication system. Such adaptive determination of PHY packet error rates may be supported through the use of a raptor code to encode and decode packets communicated within the wireless communication system. To illustrate, a transmitting device, such as a base station (or a UE), may encode data based on a raptor code to generate a set of encoded packets. In some aspects, the raptor code may be applied at the radio link control (RLC) level. For example, the transmitting device may partition the data into multiple source packets and convert the source packets to the RLC layer. The transmitting device may then encode the source packets at the RLC layer based on the raptor code to generate multiple RLC-encoded packets. The transmitting device may then convert each of the RLC-encoded packets into one or more PHY layer symbols via another encoding operation (for example, using an error-correction encoding scheme such as low density parity check (LDPC) encoding). The transmitting device may then transmit the PHY layer-encoded packets (in the form of the PHY layer symbols) to a receiving device, such as a UE (or a base station), via one or more wireless networks.

A device that successfully receives the set of encoded packets (the PHY layer-encoded packets), or at least a subset of the encoded packets, may decode all of the encoded packets in the set based on the same raptor code as that used by the transmitting device to encode the packets. For example, the receiving device may successfully decode the set of received packets by performing a decoding operation (for example, using the same error correcting scheme, such as LDPC decoding, as used by the transmitting device) on the PHY layer symbols to generate RLC-encoded packets. The receiving device may then decode the RLC-encoded packets based on the raptor code.

The receiving device may also perform one or more operations to enable adaptive determination of a PHY packet error rate associated with the raptor-based encoding. For example, the receiving device may determine a signal-to-interference-plus-noise ratio (SINR) associated with receiving the encoded packets, a channel quality indicator (CQI) associated with receiving the encoded packets, or a modulation and coding scheme (MCS) associated with receiving the encoded packets. Alternatively, the receiving device may receive an indication of the PHY packet error rate from the transmitting device. The receiving device may adaptively determine the PHY packet error rate based on the SINR, the CQI or MCS, or the indication. "Adaptively determining" the PHY packet error rate may include identifying, or selecting, the PHY packet error rate "on the fly," such as during decoding or processing of the set of encoded packets. For example, the receiving device may determine a particular PHY packet error rate that corresponds to the SINR, the CQI, or the MCS, as indicated by predetermined configuration data. As another example, the transmitting device may set the PHY packet error rate and transmit an indication of the PHY packet error rate to the receiving device. As similarly described with reference to the receiving device, the transmitting device may determine the PHY packet error rate based on a SINR determined by the transmitting device, a CQI received from the receiving device, or a MCS determined by the transmitting device.

Particular implementations of the subject matter described in this disclosure can be implemented to realize one or more of the following potential advantages. In some aspects, the present disclosure provides techniques for adaptively selecting and determining a PHY packet error rate of a set of encoded packets. In this way, a PHY packet error rate may be used that is less than (or greater than) a fixed PHY packet error rate that is maintained by other wireless communication devices. Because a coding rate and a modulation order used to encode the set of encoded packets are based on the PHY packet error rate, adjusting a PHY packet error rate may enable greater coding rates, greater modulation orders, or both, to be used as compared to maintaining a fixed PHY packet error rate. Additionally, using the raptor code to encode and decode the set of RLC-encoded packets enables a receiving device to decode the source data using only a subset of the plurality of encoded packets. Because unsuccessfully receiving one or more packets does not prevent the receiving device from decoding the source data, an acknowledgement/negative acknowledgement (ACK/NACK) scheme may not be implemented, which reduces overhead and may increase the available system bandwidth.

Figure 3:
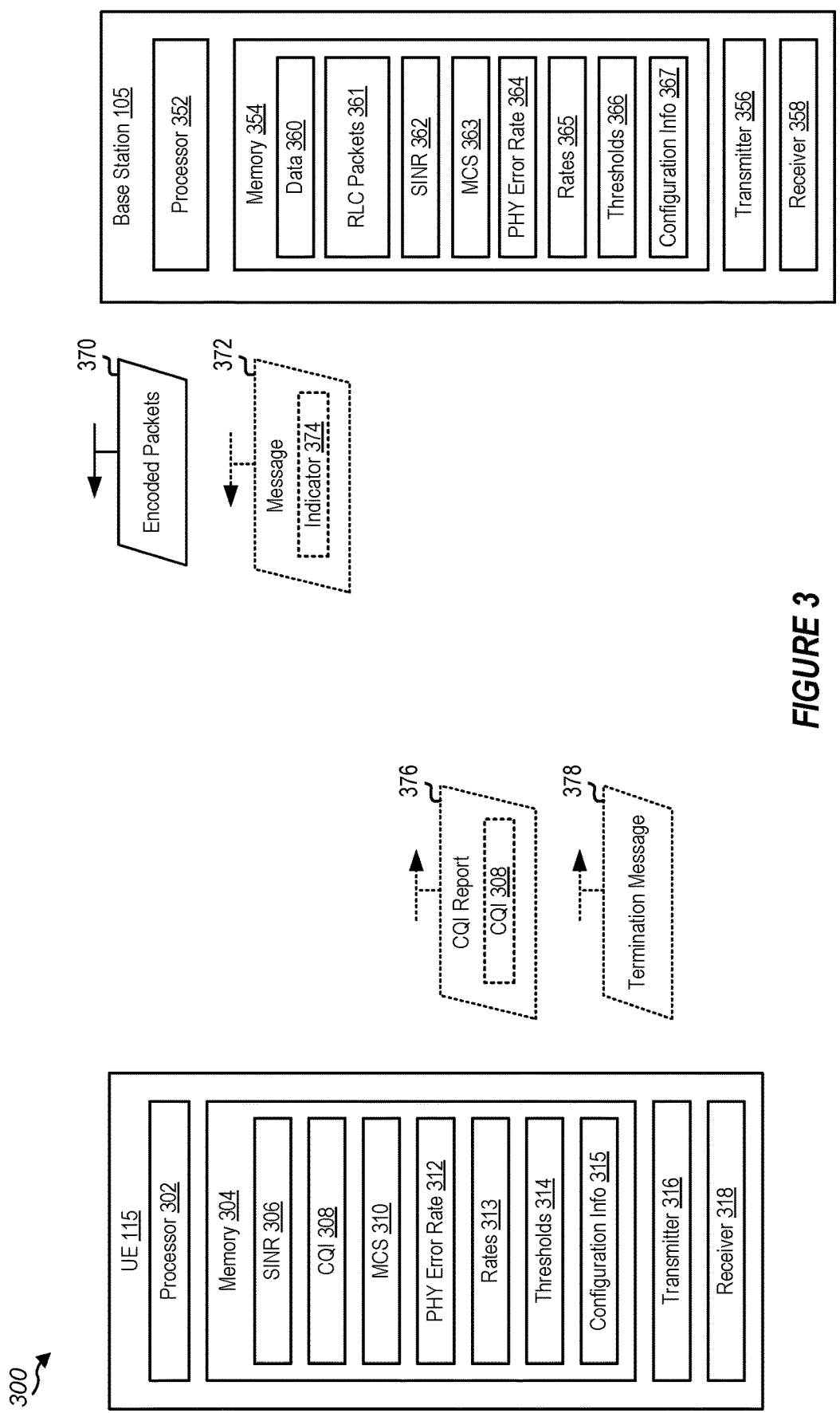
FIG. 3 is a block diagram illustrating an example wireless communication system that supports adaptive determination of physical (PHY) packet error rates according to some aspects.

FIG. 3 is a block diagram of an example wireless communications system 300 that supports adaptive determination of PHY packet error rates according to some aspects. In some examples, the wireless communications system 300 may implement aspects of the wireless network 100. The wireless communications system 300 includes the UE 115 and the base station 105. Although one UE 115 and one base station 105 are illustrated, in some other implementations, the wireless communications system 300 may generally include multiple UEs 115, and may include more than one base station 105.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 316 (hereinafter referred to collectively as "the transmitter 316"), and one or more receivers 318 (hereinafter referred to collectively as "the receiver 318"). The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

The memory 304 may be configured to store a signal-to-interference-plus-noise ratio (SINR) 306, a channel quality indicator (CQI) 308, a modulation and coding scheme (MCS) 310, a PHY packet error rate 312, one or more other rates 313, one or more thresholds 314, and predetermined configuration information 315. The SINR 306 may represent a measurement performed based on packets received by the UE 115. The CQI 308 may represent a channel quality associated with a channel via which packets are received by the UE 115. The MCS 310 may represent a MCS used to receive packets by the UE 115. The PHY packet error rate 312 may represent a PHY layer error rate associated with receiving packets by the receiver 318. The rates 313 may include additional rates associated with coding or receipt of packets by the UE 115 such as a packet data convergence protocol (PDCP) coding rate, a PHY coding rate, a PDCP data loss rate, and an efficiency rate, as non-limiting examples. In some aspects, the UE 115 may determine the PHY packet error rate 312 based on one or more of the rates 313. The thresholds 314 include thresholds that, in some examples, may be used to determine the PHY packet error rate 312, such as an efficiency rate threshold, a data loss rate threshold, and a decoding threshold, as non-limiting examples. The predetermined configuration information 315 may indicate a correspondence between PHY packet error rates and CQIs and MCSs, as further described herein.

The transmitter 316 is configured to transmit reference signals, control information and data to one or more other devices, and the receiver 318 is configured to receive references signals, synchronization signals, control information and data from one or more other devices. For example, the transmitter 316 may transmit signaling, control information and data to, and the receiver 318 may receive signaling, control information and data from, the base station 105. In some implementations, the transmitter 316 and the receiver 318 may be integrated in one or more transceivers. Additionally or alternatively, the transmitter 316 or the receiver 318 may include or correspond to one or more components of the UE 115 described with reference to FIG. 2.

The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242.

The memory 354 may be configured to store data 360, a set of radio link control (RLC) packets 361, a SINR 362, a MCS 363, a PHY packet error rate 364, one or more other rates 365, one or more thresholds 366, and predetermined configuration information 367. The data 360 may include source data that is scheduled for transmission to the UE 115. The RLC packets 361 may be generated based on converting source packets of the data 360 to the RLC layer and performing an RLC encoding operation on the converted source packets, for example, based on a raptor code. The SINR 362 may represent a measurement performed based on packets transmitted to the UE 115. The MCS 363 may represent a MCS used to transmit packets to the UE 115. The PHY packet error rate 364 may represent a PHY layer error rate associated with coding of packets transmitted to the UE 115. The rates 365 may include additional rates associated with coding or transmission of packets to the UE 115 such as a PDCP coding rate, a PHY coding rate, a PDCP data loss rate, and an efficiency rate, as non-limiting examples. In some aspects, the base station 105 may determine the PHY packet error rate 364 based on one or more of the rates 365. The thresholds 366 include thresholds that, in some examples, may be used to determine the PHY packet error rate 364, such as an efficiency rate threshold, a data loss rate threshold, and a decoding threshold, as non-limiting examples. The predetermined configuration information 367 may indicate a correspondence between PHY packet error rates and CQIs and MCSs, as further described herein.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2.

In some implementations, the wireless communications system 300 implements a 5G New Radio (NR) network. For example, the wireless communications system 300 may include multiple 5G-capable UEs 115 and multiple 5G-capable base stations 105, such as UEs and base stations configured to operate in accordance with a 5G NR network protocol such as that defined by the 3GPP.

Although operations are described herein in terms of the UE 115 and the base station 105, in some other implementations, the UE 115 may perform some or all of the operations described with reference to the base station 105, and the base station 105 may perform some or all of the operations described with reference to the UE 115. To illustrate, in some implementations, the UE 115 may be configured as a receiving device and may perform the operations described herein with reference to the UE 115, and the base station 105 may be configured as a transmitting device and may perform the operations described herein with reference to the base station 105. However, in other examples, the UE 115 may be configured as a transmitting device and may perform one or more of the operations described herein with reference to the base station 105, and the base station 105 may be configured as a receiving device and may perform one or more of the operations described herein with reference to the UE 115. As such, operations performed by a transmitting device may be performed by a UE 115 or a base station 105, and operations performed by a receiving device may be performed by the other of the UE 115 or the base station 105.

During operation of the wireless communications system 300, the base station 105 may determine to schedule the data 360 for transmission to the UE 115. Based on this determination, the base station 105 may encode the data 360 based on a raptor code to generate a set of RLC-encoded packets 361 (also generally referred to herein as "encoded packets 361" or "RLC packets 361"). For example, the base station 105 may initially partition the data 360 into a set of source packets. In some aspects, the base station 105 may convert the set of source packets to the RLC layer and encode the converted source packets based on the raptor code at the RLC layer to generate the RLC packets 361. After the raptor-based encoding operation, the base station 105 may then perform a second encoding operation to convert the RLC packets 361 into PHY layer-encoded packets 370 (also generally referred to herein as "encoded packets 370" or "PHY packets 370") each comprising of one or more PHY layer (for example, OFDM) symbols. For example, the base station 105 may perform LDPC coding, or other coding in accordance with an error-correction coding scheme, and modulation on the RLC packets 361 to convert the RLC packets 361 into the PHY layer-encoded packets 370 comprising the OFDM symbols. As a result of the raptor-based encoding operation performed at the RLC level, the number of the PHY layer-encoded packets 370 may be greater than the number of source packets.

Figure 4:
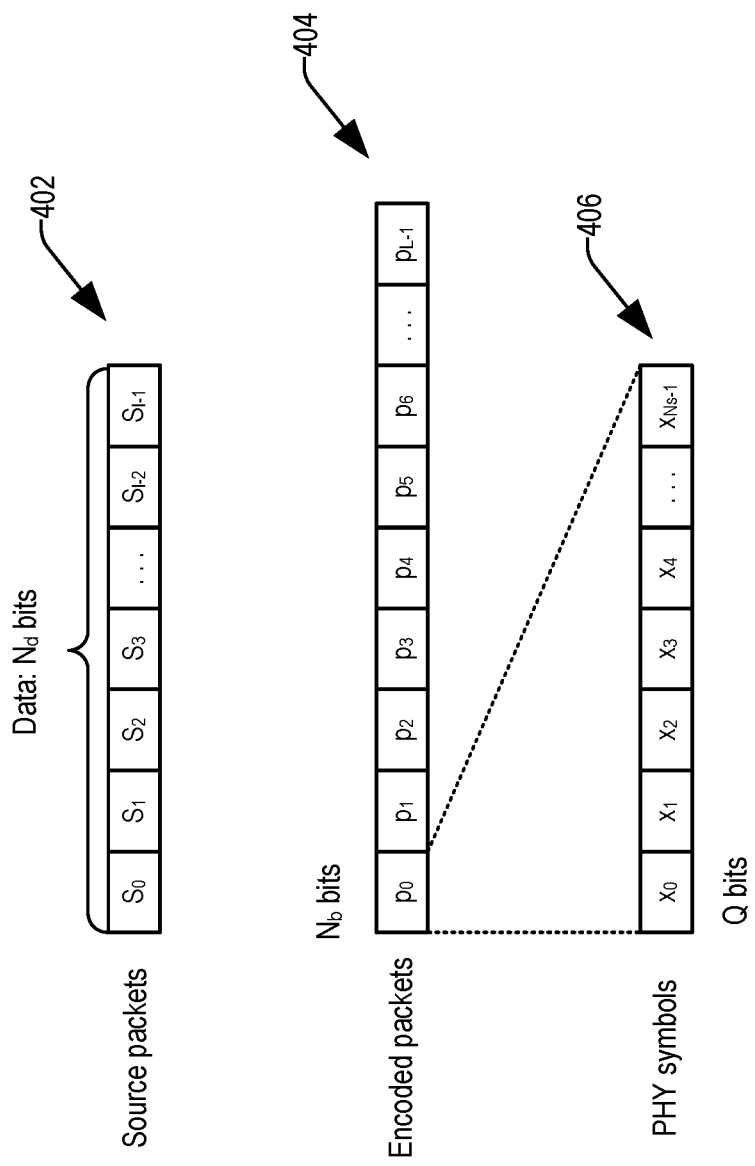
FIG. 4 is a diagram of an example of encoding data for transmission to a receiving device configured to support adaptive determination of a PHY packet error rate according to some aspects.

To illustrate, FIG. 4 is a diagram of an example of encoding data for transmission to a receiving device configured to support adaptive determination of a PHY packet error rate according to some aspects. The receiving device may include the UE 115 and the data may include the data 360 of FIG. 3. The operations described with reference to FIG. 4 may be performed by a transmitting device, which may include the base station 105 of FIG. 3.

Prior to performing raptor-based encoding of the data, the transmitting device may partition the data into source packets 402. For example, data having a size of $N_d$ bits may be partitioned into l source packets $s_0$-$s_{l-1}$. In a first encoding operation, the transmitting device may convert the source packets 402 to the RLC layer and encode the converted source packets 402 based on a raptor code to convert the source packets 402 into encoded packets 404 (which may be examples of the RLC packets 361 described with reference to FIG. 3). In some implementations, the raptor-based encoding operation may be performed at the RLC layer such that the encoded packets 404 are RLC packets. As part of encoding the source packets 402 based on the raptor code, the transmitting device may perform pre-processing on the source packets 402 to generate redundant packets. For example, the redundant packets may include or correspond to LDPC symbols or half symbols based on the source packets 402. The source packets 402 and the redundant packets may be referred to as "intermediate packets." After generating the intermediate packets, the transmitting device may generate a degree distribution for the intermediate packets. To encode the intermediate packets based on the raptor code, a degree $d_i$ is randomly chosen from the degree distribution, and $d_i$ distinct intermediate packets with uniform distribution are selected and exclusive-ORed (XORed). These operations are repeated until a particular number L of encoded packets are generated at the RLC layer. The transmitting device may then perform a second encoding operation to convert the encoded packets 404 into one or more respective PHY layer symbols (which may be examples of the encoded packets 370 described with reference to FIG. 3). For example, the transmitting device may perform LDPC encoding, or other coding in accordance with an error-correcting scheme, and modulation on the encoded packets 404 to convert the encoded packets 404 into the respective PHY layer symbols.

As shown in FIG. 4, the encoded packets 404 include L encoded packets $p_0$-$p_{L-1}$. Each of the encoded packets 404 has a size of $N_b$ bits. Each of the encoded packets 404 may be converted into a plurality of PHY layer symbols. For example, first encoded packet $p_0$ may be converted into PHY layer symbols 406. The PHY layer symbols 406 include Ns PHY layer symbols $x_0$-$x_{Ns-1}$. Each PHY layer symbol has a size of Q bits.

Because encoding the source packets 402 based on the raptor code includes generating the redundant packets, the number of encoded packets L in the encoded packets 404 is greater than the number of source packets l in the source packets 402. This may enable the receiving device to decode source data without receiving all of the PHY layer packets corresponding to the encoded packets 404. The number of PHY layer packets needed to decode the data by the receiving device is given by a decoding threshold ρ. For example, PHY layer packets corresponding to ρl of the L encoded packets are needed by the receiving device to decode the source data. The value of ρ may be set based on the competing concerns of decoding speed and error rate. For example, a larger value of ρ may result in a lower error rate, but also a lower decoding speed, while a smaller value of ρ may result in a higher decoding speed, but also a higher error rate.

To decode the received packets, the receiving device may perform a first decoding operation based on a LDPC decoding scheme and demodulation on the received packets to convert the received packets from the PHY layer to the RLC layer. The receiving device may then perform a second decoding operation based on the raptor code on the RLC packets. Such decoding may be based on a distribution of the encoded packets received by the receiving device. To illustrate, the receiving device generates a distribution of the encoded packets, selects a decoding symbol $t_j$ that is connected to only one source symbol $s_i$ from the distribution, sets $s_i$ equal $t_j$, XORs $s_i$ to all encoding symbols that are connected to $s_i$, and removes all the edges that are connected to the source symbol $s_i$. These operations are repeated until all source symbols $s_i$ are determined and the source data is successfully decoded, or until there is no encoding symbol that is connected to only one source symbol, in which case the decoding fails.

Referring back to the wireless communications system 300 of FIG. 3, after generating the encoded packets 370 (the PHY layer-encoded packets), the base station 105 transmits the encoded packets 370 to the UE 115. The UE 115 may receive the encoded packets 370 and may decode the encoded packets 370 to generate received data, as described with reference to FIG. 4. In some implementations, decoding the encoded packets 370 includes performing LDPC decoding and demodulation on the PHY layer symbols of each of encoded packets 370 to generate RLC-encoded packets. The UE 115 may then decode the RLC-encoded packets based on the same raptor code used by the base station 105.

In some implementations, the UE 115 refrains from providing feedback information to the base station 105 based on receiving the encoded packets 370. For example, the UE 115 may not transmit an ACK, or a NACK, after successfully, or unsuccessfully, receiving each of the encoded packets 370. Feedback information may not be necessary because retransmission of missed packets is not needed since the UE 115 can decode the source data without successfully receiving each of the encoded packets 370. Refraining from transmitting feedback information to the base station 105 reduces network overhead and increases an available system bandwidth of the wireless communications system 300.

In addition to decoding the encoded packets 370, the UE 115 may adaptively determine the PHY packet error rate 312 associated with receiving the encoded packets 370. The PHY packet error rate 312 may be determined based on one or more other operations performed by the UE 115. For example, the UE 115 may determine the SINR 306, the CQI 308, or the MCS 310, or the UE 115 may receive a message 372 that includes an indicator 374 from the base station 105. The UE 115 may adaptively determine the PHY packet error rate 312 based on the SINR 306, the CQI 308, the MCS 310, or the indicator 374.

In some implementations, the UE 115 determines the PHY packet error rate 312 based on the SINR 306. For example, the UE 115 may measure signal strength, interference, and noise associated with receiving the encoded packets 370 to determine the SINR 306. In some implementations, to determine the PHY packet error rate 312, the UE 115 determines a PDCP coding rate and a PHY coding rate based on the SINR 306. The rates 313 may include the PDCP coding rate and the PHY coding rate. The PDCP coding rate (also referred to as an outer coding rate) associated with the encoded packets 370 may be determined according to Equation 1 below, where $r_o$ is the PDCP coding rate, $\rho$ is the decoding threshold (included in the thresholds 314) and is greater than or equal to one, l is the number of source packets that the data 360 is partitioned into, and L is the number encoded packets in the encoded packets 370:

$$r_o = \frac{\rho l}{L} \quad \text{Equation 1.}$$

The UE 115 may determine the PHY coding rate (also referred to as an inner coding rate) associated with the encoded packets 370 according to Equation 2 below, where $r_i$ is the PHY coding rate, $N_b$ is the size (in bits) of each of the encoded packets 370, $N_s$ is the number of PHY layer symbols associated with each of the encoded packets 370, and Q is the size (in bits) of each of the PHY layer symbols:

$$r_i = \frac{N_b}{N_s Q} \quad \text{Equation 2.}$$

In some implementations, the UE 115 also determines an efficiency rate associated with receiving the encoded packets 370. For example, the UE 115 may determine the efficiency rate according to Equation 3 below, where n is the efficiency rate:

$$\eta = \frac{lN_b}{LN_s Q} = \frac{1}{\rho} \cdot r_o \cdot r_i \quad \text{Equation 3.}$$

In some implementations, the UE 115 determines the PHY packet error rate 312 based on Equation 4 below, where $\varepsilon_{PHY}$ is the PHY packet error rate 312, Pr is a probability, and SINR is the SINR 306:

$$\varepsilon_{PHY} = E\left(Pr\left(R(SINR) < \frac{N_b}{N_s} = r_i Q\right)\right) \quad \text{Equation 4.}$$

In some legacy wireless communication systems, the PHY error rate is set at a fixed value, such as 0.1, and UEs may calculate the SINR, determine the best available coding rate with the PHY error rate of 0.1, and report the CQI to a base station. The base station may receive the CQI and determines a coding rate, such as the PHY coding rate. However, constraining the PHY error rate to a fixed value also constrains the coding rates and reduces the PDCP data loss rate that can be used by the UEs and the base station.

Wireless communications systems in accordance with the present disclosure enable adaptive determination of the PHY packet error rate 312, where the PHY packet error rate 312 is not a fixed value. In some implementations, determining the PHY packet error rate 312 includes determining a PDCP data loss rate (included in the rates 313) associated with receiving the encoded packets 370. For example, the UE 115 may determine the PDCP data loss rate according to Equation 5 below, where EPDCP is the PDCP data loss rate:

$$\varepsilon_{PDCP} = \sum_{i=0}^{l-1} \binom{L}{i}(1 - \varepsilon_{PHY})^i (\varepsilon_{PHY})^{L-i} + \sum_{i=l}^{L-1} \binom{L}{i}(1 - \varepsilon_{PHY})^i (\varepsilon_{PHY})^{L-i} 0.85 \cdot 0.567^{i-l} \quad \text{Equation 5.}$$

When the number of successfully received encoded packets is less than l, data loss may occur, such that the source data is not successfully decodable by the UE 115. When there are i≥l successfully received encoded packets, the decoding failure of the source data encoded based on the raptor code is $0.85*0.567^{i-l}$. Further, when the number of successfully received encoded packets is less than $\rho l$, data loss may approximately occur. When the number of successfully received encoded packets is equal to or greater than $\rho l$, data loss may approximately not occur. For this reason, Equation 5 may be rewritten as Equation 6 below:

$$\varepsilon_{PDCP} \approx \sum_{k=0}^{\rho l-1} \binom{L}{i}(1 - \varepsilon_{PHY})^i (\varepsilon_{PHY})^{L-i} \quad \text{Equation 6.}$$

In some implementations, to achieve higher coding rates, the UE 115 may determine the PDCP data loss rate such that an efficiency threshold is satisfied. For example, the UE 115 may determine the PDCP data loss rate such that the PDCP data loss rate is a minimum value that enables the efficiency rate determined according to Equation 3 to satisfy an efficiency threshold of the thresholds 314. To illustrate, the UE 115 may minimize Expression 1 below, subject to the efficiency rate satisfying the efficiency threshold:

$$\sum_{i=0}^{l-1} \binom{L}{i}(1-\varepsilon_{PHY})^i(\varepsilon_{PHY})^{L-i} + \sum_{i=1}^{L-1}\binom{L}{i}(1-\varepsilon_{PHY})^i(\varepsilon_{PHY})^{L-i}0.85\cdot 0.567^{i-l}$$

Expression 1.

The UE 115 may minimize Expression 1 subject to Expression 2 below, where $\eta_0$ is the efficiency threshold:

$$\frac{1}{\rho}\cdot r_o \cdot r_i \geq \eta_0$$

Expression 2.

In some implementations, the UE 115 determines the PDCP data loss rate offline. In other implementations, the UE 115 determines the PDCP data loss rate during processing of the encoded packets 370.

Additionally or alternatively, to achieve higher coding rates, the UE 115 may determine the efficiency rate such that a data loss threshold is satisfied. For example, the UE 115 may determine the efficiency rate such that the efficiency rate is a maximum value that enables the PDCP data loss rate determined according to Equation 5 to satisfy a data loss threshold of the thresholds 314. To illustrate, the UE 115 may maximize Expression 3 below, subject to the PDCP data loss rate satisfying the data loss threshold:

$$\frac{1}{\rho}\cdot r_o \cdot r_i$$

Expression 3.

The UE 115 may maximize Expression 3 subject to Expression 4 below, where $\varepsilon_0$ is the efficiency threshold:

$$\sum_{i=0}^{l-1}\binom{L}{i}(1-\varepsilon_{PHY})^i(\varepsilon_{PHY})^{L-i} + \sum_{i=l}^{L-1}\binom{L}{i}(1-\varepsilon_{PHY})^i(\varepsilon_{PHY})^{L-i}0.85\cdot 0.567^{i-l} \leq \varepsilon_0.$$

Expression 4.

In some implementations, the UE 115 determines the efficiency rate offline. In other implementations, the UE 115 determines the efficiency rate during processing of the encoded packets 370. In some implementations, determining the efficiency rate includes performing a bisectional search over a finite set of values of the PHY packet error rate 312. For example, the UE 115 may perform a bisectional search over {0.1, 0.2, . . . , 0.9} or $\left\{\frac{t}{T}\right\}_{t=1}^{T-1}$, as non-limiting examples.

In some other implementations, instead of determining the PHY packet error rate 312, the UE 115 receives a PHY packet error rate indication from the base station 105. For example, the base station 105 may select the PHY packet error rate 364 based on the SINR 362, similar to as described above with reference to the UE 115, and the base station 105 may transmit the message 372 that includes the indicator 374 to the UE 115. The indicator 374 may indicate the PHY packet error rate 364. The UE 115 may receive the message 372 and set the PHY packet error rate 312 at the UE 115 to be equal to the PHY packet error rate 364 indicated by the indicator 374. In some implementations, the indicator 374 is included in downlink control information (DCI), a medium access control control element (MAC-CE), or a radio resource configuration (RRC) message. For example, the message 372 may include or correspond to DCI, a MAC-CE, or a RRC message.

In some such implementations, the PHY packet error rate 312 and the PHY packet error rate 364 may be within a predetermined finite set of values. For example, the base station 105 may be configured to select the PHY packet error rate 364 to be within a predetermined finite set of values prior to transmitting the message 372 to the UE 115. As one illustrative example, the PHY packet error rate 312 and the PHY packet error rate 364 may be within {0.1, 0.2, . . . , 0.9}. Additionally, the UE 115 may select the CQI 308, the MCS 310, or both, based on the PHY packet error rate 312 and the predetermined configuration information 315. For example, the predetermined configuration information 315 may include a plurality of tables. Each table of the plurality of tables may indicate CQIs and MCSs associated with a respective PHY packet error rate value. In some implementations, the predetermined configuration information 315 is specified by a 3GPP wireless communication standard specification. To further illustrate, the predetermined configuration information 315 may include a first table indicating one or more CQIs, one or more MCSs, or both one or more CQIs and one or more MCSs associated with a PHY packet error rate of 0.1, a second table indicating one or more CQIs, one or more MCSs, or both one or more CQIs and one or more MCSs associated with a PHY packet error rate of 0.2, and other tables associated with PHY packet error rates of {0.3, 0.4, 0.5, 0.6, 0.7, 0.8, 0.9}. After receiving the indicator 374 and setting the PHY packet error rate 312, the UE 115 may select the CQI 308, the MCS 310, or both, from the table of the predetermined configuration information 315 that corresponds to the value of the PHY packet error rate 312.

In some other implementations, the UE 115 determines the PHY packet error rate 312 based on the predetermined configuration information 315 and the CQI 308 or the MCS 310. To illustrate, the predetermined configuration information 315 may include a table that indicates CQIs, MCSs, or both CQIs and MCSs, associated with PHY packet error rate values. For example, one row of the table may indicate a MCS index and, among other information, a PHY packet error rate value associated with the MCS index. As another example, another row of the table may indicate a CQI index and, among other information, a PHY packet error rate value associated with the CQI index. In some implementations, the predetermined configuration information 315 is specified by a 3GPP wireless communication standard specification. The UE 115 may determine the CQI 308 based on receiving the encoded packets 370 or the MCS 310 associated with the encoded packets 370, and the UE 115 may select the value of the PHY packet error rate 312 from the table that corresponds to the CQI 308 or the MCS 310.

In some implementations, after successfully receiving a sufficient number of encoded packets at the UE 115 to enable decoding of the source data, such as a number of encoded packets based on the decoding threshold ρ associated with the raptor code, the UE 115 may request that the base station 105 terminate transmission of encoded packets. For example, based on successfully decoding source data from received packets of the encoded packets 370, the UE 115 may generate and transmit a termination message 378 to the base station 105. As described above, because the data 360 is encoded based on a raptor code, the encoded packets 370 may include more encoded packets than are needed to decode source data at the UE 115. The base station 105 may receive the termination message 378 and terminate transmission of the encoded packets 370 based on receipt of the termination message 378. For example, if there are any remaining encoded packets of the encoded packets 370 that have not yet been transmitted by the base station 105, the base station 105 may discard the remaining encoded packets without transmission.

Although determination of the PHY packet error rate 312 has been described with reference to the UE 115, the base station 105 may also, or in the alternative, determine or select PHY packet error rates, such as the PHY packet error rate 364. In some implementations, the base station 105 determines the SINR 362 and selects the PHY packet error rate 364 based on the SINR 362. For example, the base station 105 may measure signal strength and interference associated with transmission to the UE 115 to determine the SINR 362, and the base station 105 may select the PHY packet error rate 364 based on the SINR 362 in a similar way to the UE 115 determining the PHY packet error rate 312 based on the SINR 306. To illustrate, the base station 105 may determine a PDCP coding rate, a PHY coding rate, a PDCP data loss rate, and an efficiency rate of rates 365 according to any of Equations 1-6 and Expressions 1-4 above. In some other implementations, the base station 105 may select the PHY packet error rate 364 based on the CQI 308 or the MCS 363. For example, the base station 105 may select the MCS 363 associated with the encoded packets 370 or may receive a CQI report 376 from the UE 115 that includes the CQI 308 determined by the UE 115. The base station 105 may select a value of the PHY packet error rate 364 that corresponds to the CQI 308 or the MCS 363 based on the predetermined configuration information 367. For example, the predetermined configuration information 367 may include or correspond to the predetermined configuration information 315, and may include one or more tables that associate CQIs, MCSs, or both CQIs and MCSs, with respective PHY packet error rate values.

As described with reference to FIG. 3, the present disclosure provides techniques for encoding data for communication via the wireless communications system 300 using raptor codes and for enabling adaptive determination of PHY packet error rates at devices of the wireless communications system 300, such as the UE 115 and the base station 105. For example, a receiving device may receive the encoded packets 370 from a transmitting device and decode received packets based on a raptor code used to encode source data at the transmitting device. Additionally, the receiving device (or the transmitting device) may determine or select a PHY packet error rate adaptively, such that the PHY packet error rate is not a fixed value. By adaptively determining or selecting the PHY packet error rate, devices of the wireless communications system 300 may reduce an overall PDCP data loss rate and increase coding rates or modulation orders used to communicate data as compared to if the PHY packet error rate is set to a fixed value. Additionally or alternatively, the receiving device may not transmit feedback information to the transmitting device based on receiving the encoded packets 370, which may reduce overhead and increase available system bandwidth within the wireless communications system 300.

Figure 5:
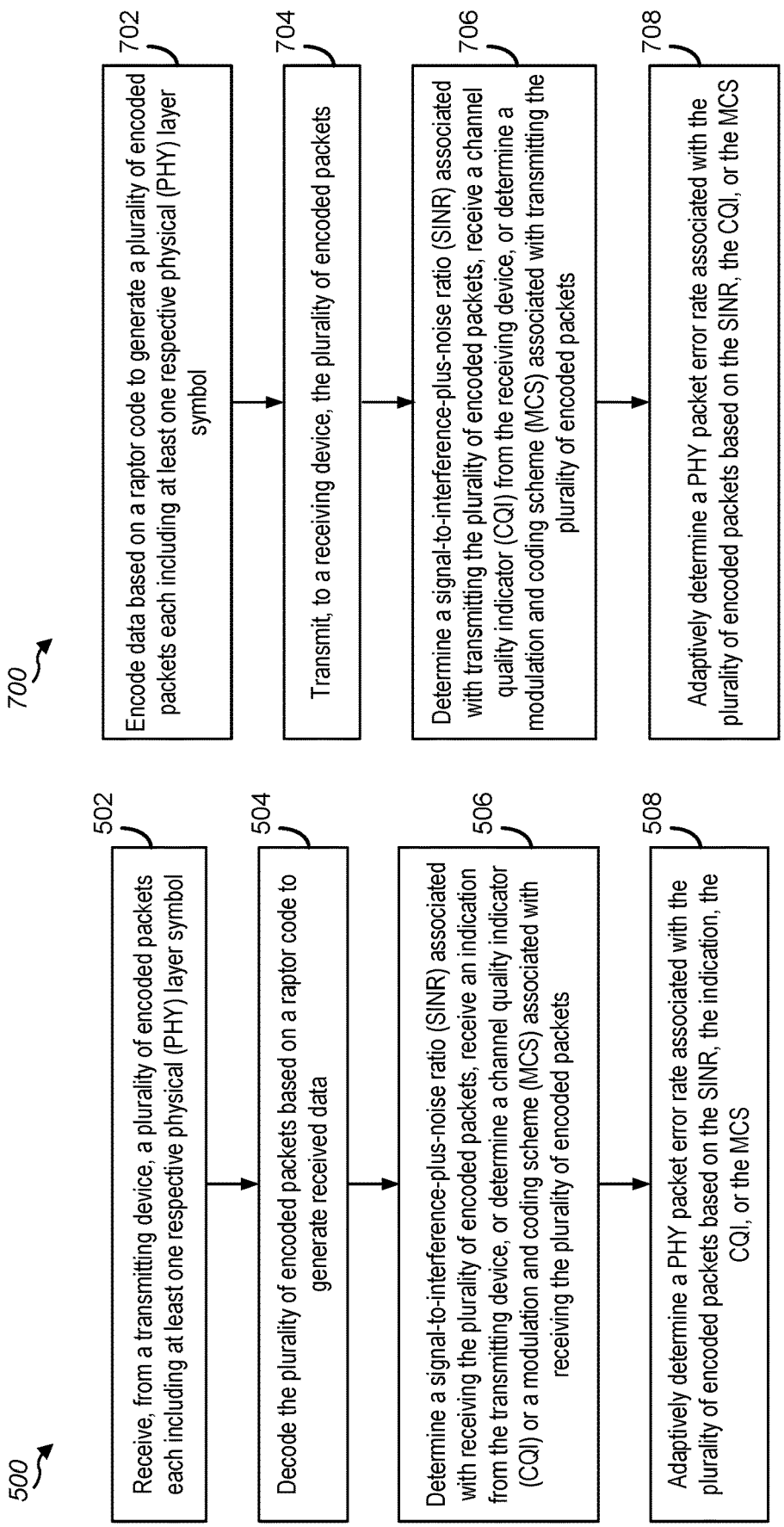
FIG. 5 is a flow diagram illustrating an example process that supports adaptive determination of PHY packet error rates according to some aspects.

FIG. 5 is a flow diagram illustrating an example process 500 that supports adaptive determination of PHY packet error rates according to some aspects. Operations of the process 500 may be performed by a UE, such as the UE 115 described above with reference to FIGS. 1-3. For example, example operations (also referred to as "blocks") of the process 500 may enable the UE to adaptively determine a PHY packet error rate.

Figure 6:
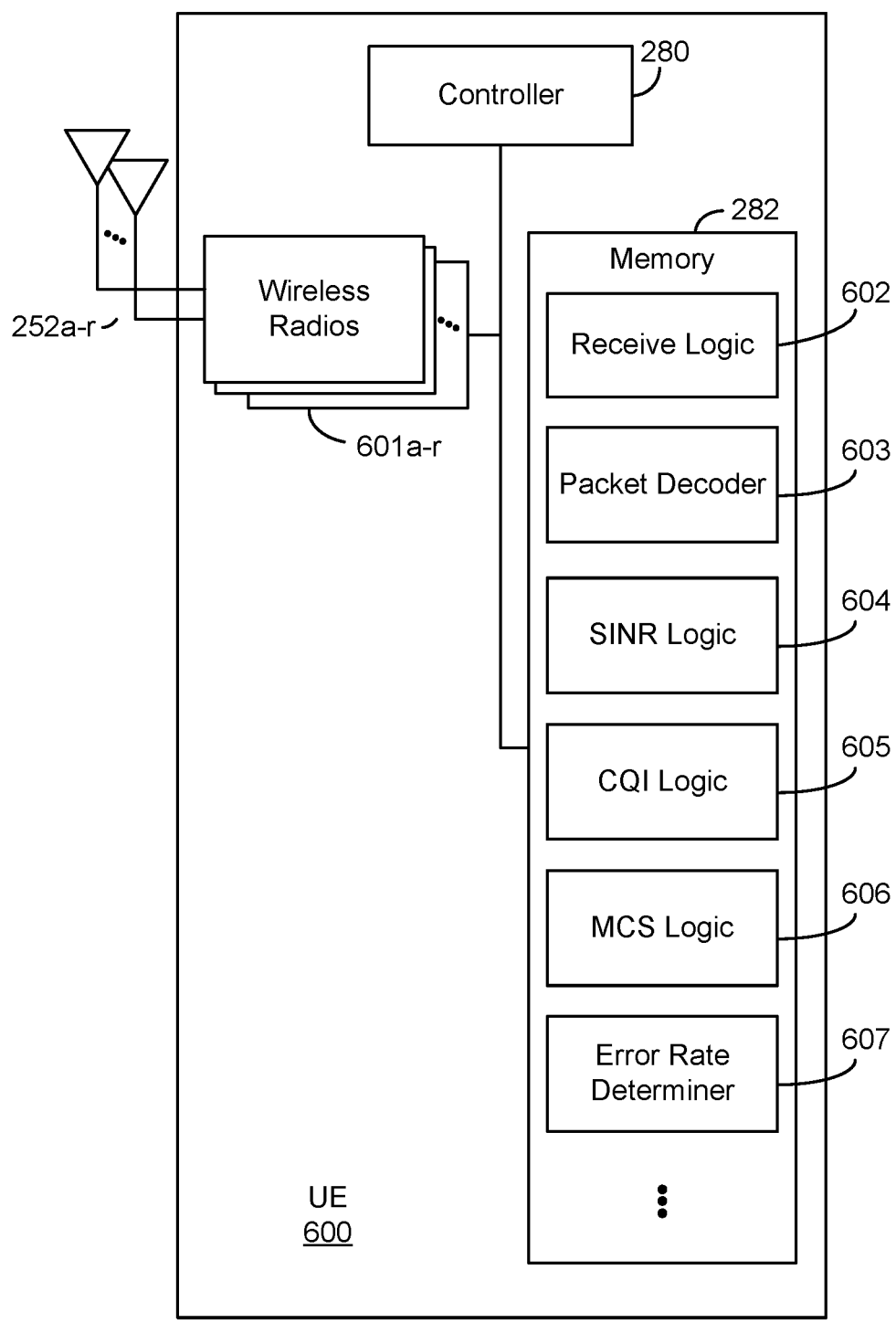
FIG. 6 is a block diagram of an example UE that supports adaptive determination of PHY packet error rates according to some aspects.

FIG. 6 is a block diagram of an example UE 600 that supports adaptive determination of PHY packet error rates according to some aspects. The UE 600 may be configured to perform operations, including the blocks of the process 500 described with reference to FIG. 5, to adaptively determine a PHY packet error rate. In some implementations, the UE 600 includes the structure, hardware, and components shown and described with reference to the UE 115 of FIG. 2 or 3. For example, the UE 600 includes the controller 280, which operates to execute logic or computer instructions stored in the memory 282, as well as controlling the components of the UE 600 that provide the features and functionality of the UE 600. The UE 600, under control of the controller 280, transmits and receives signals via wireless radios 601*a-r* and the antennas 252*a-r*. The wireless radios 601*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

Figure 8:
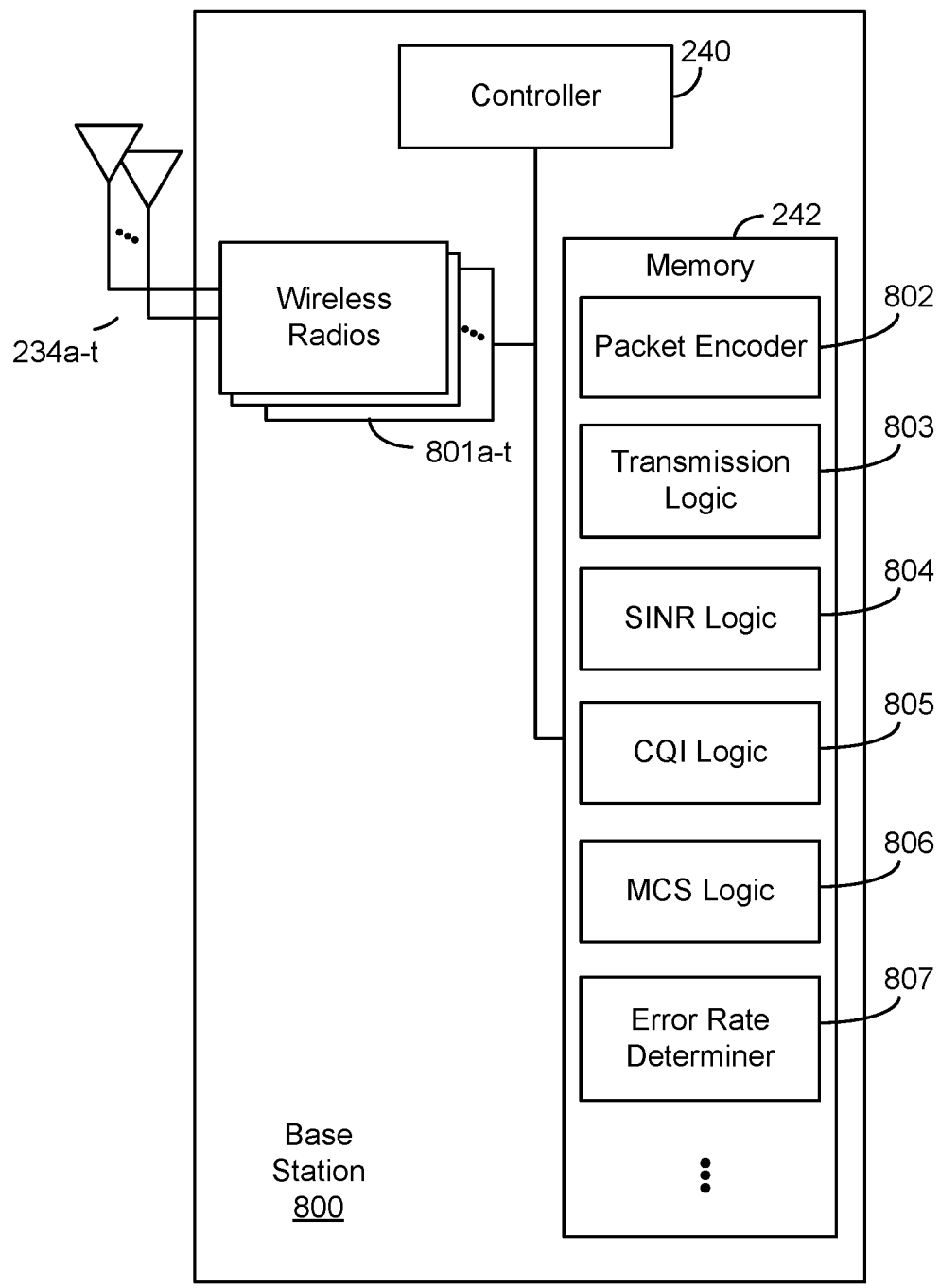
FIG. 8 is a block diagram of an example base station that supports adaptive determination of PHY packet error rates according to some aspects.

As shown, the memory 282 may include receive logic 602, packet decoder 603, SINR logic 604, CQI logic 605, MCS logic 606, and error rate determiner 607. The receive logic 602 may be configured to enable reception of messages or signals, such as encoded packets, the packet decoder 603 may be configured to decode the encoded packets, the SINR logic 604 may be configured to determine a SINR associated with receiving the encoded packets, the CQI logic 605 may be configured to determine a CQI associated with receiving the encoded packets, the MCS logic 606 may be configured to determine a MCS associated with the encoded packets, and the error rate determiner 607 may be configured to adaptively determine a PHY packet error rate associated with the encoded packets. The UE 600 may receive signals from or transmit signals to one or more network entities, such as the base station 105 of FIGS. 1-3 or a base station as illustrated in FIG. 8.

Referring back to the process 500 of FIG. 5, in block 502, the UE 600 receives, from a transmitting device, a plurality of encoded packets each including at least one respective PHY layer symbol. To illustrate, the UE 600 may execute, under control of the controller 280, the receive logic 602 stored in the memory 282. The execution environment of the receive logic 602 provides the functionality to receive encoded packets each including at least one respective PHY layer symbol.

In block 504, the UE 600 decodes the plurality of encoded packets based on a raptor code to generate received data. To illustrate, the UE 600 may execute, under control of the controller 280, the packet decoder 603 stored in the memory 282. The execution environment of the packet decoder 603 provides the functionality to decode the encoded packets based on a raptor code to generate received data.

In block 506, the UE 600 determines a SINR associated with receiving the plurality of encoded packets, receives an indication from the transmitting device, or determines a CQI or a MCS associated with receiving the plurality of encoded packets. To illustrate, the UE 600 may execute, under control of the controller 280, the SINR logic 604, the receive logic 602, the CQI logic 605, or the MCS logic 606 stored in the memory 282. The execution environment of the SINR logic 604 provides the functionality to determine a SINR associated with receiving the encoded packets. The execution environment of the receive logic 602 provides the functionality to receive an indication from the transmitting device. The execution environment of the CQI logic 605 provides the functionality to determine a CQI associated with receiving the encoded packets. The execution environment of the MCS logic 606 provides the functionality to determine a MCS associated with the encoded packets.

In block 508, the UE 600 adaptively determines a PHY packet error rate associated with the plurality of encoded packets based on the SINR, the indication, the CQI, or the MCS. To illustrate, the UE 600 may execute, under control of the controller 280, the error rate determiner 607 stored in the memory 282. The execution environment of the error rate determiner 607 provides the functionality to adaptively determine a PHY packet error rate associated with the encoded packets based on the SINR, the indication, the CQI, or the MCS.

In some implementations, decoding the plurality of encoded packets based on the raptor code includes performing LDPC decoding and demodulation on the at least one respective PHY layer symbol of each encoded packet of the plurality of encoded packets to generate a plurality of respective encoded RLC packets and decoding the plurality of encoded RLC packets based on the raptor code. Additionally, or alternatively, a number of encoded packets in the plurality of encoded packets is greater than a number of RLC layer source packets used to encode the plurality of encoded packets. Additionally or alternatively, the process 500 may further include refraining from providing feedback information to the transmitting device based on receiving the plurality of encoded packets.

In some implementations, the process 500 may further include determining a PDCP coding rate and a PHY coding rate based on the SINR. The PHY packet error rate may be determined based on the SINR. In some such implementations, determining the PDCP coding rate and the PHY coding rate includes determining a PDCP data loss rate associated with receiving the plurality of encoded packets that satisfies an efficiency threshold. In some such implementations, the PDCP data loss rate is a minimum value that satisfies the efficiency threshold. Additionally, or alternatively, determining the PDCP data loss rate may include minimizing, subject to the efficiency threshold, $$\sum_{i=0}^{l-1} \binom{L}{i}(1-\varepsilon_{PHY})^i(\varepsilon_{PHY})^{L-i} + \sum_{i=1}^{L-1} \binom{L}{i}(1-\varepsilon_{PHY})^i(\varepsilon_{PHY})^{L-i} 0.85 \cdot 0.567^{i-l}$$

In such implementations, l includes a number of RLC layer source packets used to generate the plurality of encoded packets, L includes a number of encoded packets in the plurality of encoded packets, and $\varepsilon_{PHY}$ includes the PHY packet error rate.

In some other implementations, determining the PDCP coding rate and the PHY coding rate includes determining an efficiency rate associated with receiving the plurality of encoded packets that satisfies a data loss rate threshold. In some such implementations, the efficiency rate is a maximum value that satisfies the data loss rate threshold. Additionally, or alternatively, determining the efficiency rate may include maximizing, subject to the data loss rate threshold, $$\frac{1}{\rho} \cdot r_o \cdot r_i$$

In such implementations, ρ includes a decoding threshold associated with the raptor code, $r_o$ includes the PDCP coding rate, and $r_i$ includes the PHY coding rate. In some such implementations, determining the efficiency rate includes performing a bisectional search over a finite set of values of the PHY packet error rate.

In some implementations, the PHY packet error rate is determined based on the indication, and the indication is included in DCI, a MAC-CE, or a RRC message. In some such implementations, a value of the PHY packet error rate is within a predetermined finite set of values. Additionally, or alternatively, the process 500 may also include selecting the CQI, the MCS, or both the CQI and the MCS based on the PHY packet error rate and predetermined configuration information stored at the receiving device. In some such implementations, the predetermined configuration information includes a plurality of tables. Each table of the plurality of tables indicates CQIs and MCSs associated with a respective PHY packet error rate value.

In some implementations, the process 500 further includes determining the PHY packet error rate based on predetermined configuration information stored at the receiving device and the CQI or the MCS. In some such implementations, the predetermined configuration information includes a table indicating a plurality of CQIs, a plurality of MCSs, or both a plurality of CQIs and a plurality of MCSs associated with a plurality of PHY packet error rate values.

FIG. 7 is a flow diagram illustrating an example process 700 that supports adaptive determination of PHY packet error rates according to some aspects. Operations of the process 700 may be performed by a base station, such as the base station 105 described above with reference to FIGS. 1-3. For example, example operations of the process 700 may enable a base station to adaptively determine a PHY packet error rate.

FIG. 8 is a block diagram of an example base station 800 that supports adaptive determination of PHY packet error rates according to some aspects. The base station 800 may be configured to perform operations, including the blocks of the process 700 described with reference to FIG. 7, to adaptively determine a PHY packet error rate. In some implementations, the base station 800 includes the structure, hardware, and components shown and described with reference to the base station 105 of FIGS. 1-3. For example, the base station 800 may include the controller 240, which operates to execute logic or computer instructions stored in the memory 242, as well as controlling the components of the base station 800 that provide the features and functionality of the base station 800. The base station 800, under control of the controller 240, transmits and receives signals via wireless radios 801*a-t* and the antennas 234*a-t*. The wireless radios 801*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include packet encoder 802, transmission logic 803, SINR logic 804, CQI logic 805, MCS logic 806, and error rate determiner 807. The packet encoder 802 may be configured to encode data to generate encoded packets, the transmission logic 803 may be configured to enable transmission of messages or signals, such as the encoded packets, the SINR logic 804 may be configured to determine a SINR associated with transmitting the encoded packets, the CQI logic 805 may be configured to determine a CQI associated with transmitting the encoded packets, the MCS logic 806 may be configured to determine a MCS associated with the encoded packets, and the error rate determiner 807 may be configured to adaptively determine a PHY packet error rate associated with the encoded packets. The base station 800 may receive signals from or transmit signals to one or more UEs, such as the UE 115 of FIGS. 1-3 or the UE 600 of FIG. 6.

Referring back to the process 700 of FIG. 7, in block 702, the base station 800 encodes data based on a raptor code to generate a plurality of encoded packets each including at least one respective PHY layer symbol. To illustrate, the base station 800 may execute, under control of the controller 240, the packet encoder 802 stored in the memory 242. The execution environment of the packet encoder 802 provides the functionality to encode data based on a raptor code to generate encoded packets each including at least one respective PHY layer symbol.

In block 704, the base station 800 transmits, to a receiving device, the plurality of encoded packets. To illustrate, the base station 800 may execute, under control of the controller 240, the transmission logic 803 stored in the memory 242. The execution environment of the transmission logic 803 provides the functionality to transmit the encoded packets.

In block 706, the base station 800 determines a SINR associated with transmitting the plurality of encoded packets, receives a CQI from the receiving device, or determines a MCS associated with transmitting the plurality of encoded packets. To illustrate, the base station 800 may execute, under control of the controller 240, the SINR logic 804, the CQI logic 805, or the MCS logic 806 stored in the memory 242. The execution environment of the SINR logic 804 provides the functionality to determine a SINR associated with transmitting the encoded packets. The execution environment of the CQI logic 805 provides the functionality to receive a CQI from the receiving device. The execution environment of the MCS logic 806 provides the functionality to determine a MCS associated with the encoded packets.

In block 708, the base station 800 adaptively determines a PHY packet error rate associated with the plurality of encoded packets based on the SINR, the CQI, or the MCS. To illustrate, the base station 800 may execute, under control of the controller 240, the error rate determiner 807 stored in the memory 242. The execution environment of the error rate determiner 807 provides the functionality to adaptively determine a PHY packet error rate associated with the encoded packets based on the SINR, the CQI, or the MCS.

In some implementations, encoding the data based on the raptor code includes partitioning the data into a plurality of source packets, encoding the plurality of source packets based on the raptor code to generate a plurality of encoded RLC packets, and performing LDPC coding and modulation on the plurality of encoded RLC packets to generate the at least one respective PHY layer symbol of each encoded packet of the plurality of encoded packets. In some such implementations, a number of encoded packets in the plurality of encoded packets is greater than a number of source packets in the plurality of source packets. Additionally or alternatively, the base station 800 may not be configured to receive feedback information from the receiving device based on transmitting the plurality of encoded packets.

In some implementations, the process 700 further includes determining a PDCP coding rate and a PHY coding rate based on the SINR. The PHY packet error rate may be determined based on the SINR. In some such implementations, determining the PDCP coding rate and the PHY coding rate includes determining a PDCP data loss rate associated with transmitting the plurality of encoded packets that satisfies an efficiency threshold. In some such implementations, the PDCP data loss rate is a minimum value that satisfies the efficiency threshold. Additionally, or alternatively, determining the PDCP data loss rate may include minimizing, subject to the efficiency threshold, $$\sum_{i=0}^{l-1}\binom{L}{i}(1-\varepsilon_{PHY})^i(\varepsilon_{PHY})^{L-i} + \sum_{i=l}^{L-1}\binom{L}{i}(1-\varepsilon_{PHY})^i(\varepsilon_{PHY})^{L-i}0.85 \cdot 0.567^{i-l}$$

In such implementations, l includes a number of source packets used to generate the plurality of encoded packets, L includes a number of encoded packets in the plurality of encoded packets, and $\varepsilon_{PHY}$ includes the PHY packet error rate.

In some other implementations, determining the PDCP coding rate and the PHY coding rate includes determining an efficiency rate associated with transmitting the plurality of encoded packets that satisfies a data loss rate threshold. In some such implementations, the efficiency rate is a maximum value that satisfies the data loss rate threshold. Additionally, or alternatively, determining the efficiency rate may include maximizing, subject to the data loss rate threshold, $$\frac{1}{\rho} \cdot r_o \cdot r_i$$

In such implementations, $\rho$ includes a decoding threshold associated with the raptor code, $r_o$ includes the PDCP coding rate, and $r_i$ includes the PHY coding rate. In some such implementations, determining the efficiency rate includes performing a bisectional search over a finite set of values of the PHY packet error rate.

In some implementations, the process 700 also includes transmitting, to the receiving device, an indication of the PHY packet error rate. In some such implementations, the indication of the PHY packet error rate is included in DCI, a MAC-CE, or a RRC message. Additionally, or alternatively, a value of the PHY packet error rate may be within a predetermined finite set of values. In some such implementations, the process 700 further includes selecting the CQI, the MCS, or both the CQI and the MCS based on the PHY packet error rate and predetermined configuration information stored at the transmitting device. In some such implementations, the predetermined configuration information includes a plurality of tables. Each table of the plurality of tables indicates CQIs and MCSs associated with a respective PHY packet error rate value.

In some implementations, the process 700 further includes determining the PHY packet error rate based on predetermined configuration information stored at the transmitting device and the CQI or the MCS. In some such implementations, the predetermined configuration information includes a table indicating a plurality of CQIs, a plurality of MCSs, or both a plurality of CQIs and a plurality of MCSs associated with a plurality of PHY packet error rate values.

In some implementations, the process 700 further includes receiving, from the receiving device, a termination message associated with the plurality of encoded packets and terminating transmission of the plurality of encoded packets based on receipt of the termination message.

It is noted that one or more blocks (or operations) described with reference to FIGS. 5 and 7 may be combined with one or more blocks (or operations) described with reference to another of the figures. For example, one or more blocks (or operations) of FIG. 5 may be combined with one or more blocks (or operations) of FIG. 7. As another example, one or more blocks associated with FIG. 5 or 7 may be combined with one or more blocks (or operations) associated with FIG. 2 or 3. Additionally, or alternatively, one or more operations described above with reference to FIGS. 1-7 may be combined with one or more operations described with reference to FIG. 8.

In some aspects, techniques for enabling adaptive determination of PHY packet error rates may include additional aspects, such as any single aspect or any combination of aspects described below or in connection with one or more other processes or devices described elsewhere herein. In some aspects, enabling adaptive determination of PHY packet error rates may include an apparatus configured to receive, from a transmitting device, a plurality of encoded packets each including at least one respective PHY layer symbol and to decode the plurality of encoded packets based on a raptor code to generate received data. The apparatus may also be configured to determine a SINR associated with receiving the plurality of encoded packets, to receive an indication from the transmitting device, or to determine a CQI or a MCS associated with receiving the plurality of encoded packets. The apparatus may further be configured to adaptively determine a PHY packet error rate associated with the plurality of encoded packets based on the SINR, the indication, the CQI, or the MCS. In some implementations, the apparatus includes a wireless device, such as a receiving device. In some implementations, the receiving device includes a UE. In some other implementations, the transmitting device includes a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, decoding the plurality of encoded packets based on the raptor code includes performing LDPC decoding and demodulation on the at least one respective PHY layer symbol of each encoded packet of the plurality of encoded packets to generate a plurality of respective encoded RLC packets and decoding the plurality of encoded RLC packets based on the raptor code.

In a second aspect, alone or in combination with the first aspect, a number of encoded packets in the plurality of encoded packets is greater than a number of RLC layer source packets used to encode the plurality of encoded packets.

In a third aspect, alone or in combination with one or more of the first through second aspects, the apparatus includes a UE, and the transmitting device includes a base station.

In a fourth aspect, alone or in combination with one or more of the first through third aspects, the apparatus refrains from providing feedback information to the transmitting device based on receiving the plurality of encoded packets.

In a fifth aspect, alone or in combination with one or more of the first through fourth aspects, the apparatus determines a PDCP coding rate and a PHY coding rate based on the SINR. The PHY packet error rate is determined based on the SINR.

In a sixth aspect, in combination with the fifth aspect, determining the PDCP coding rate and the PHY coding rate includes determining a PDCP data loss rate associated with receiving the plurality of encoded packets that satisfies an efficiency threshold.

In a seventh aspect, in combination with the sixth aspect, the PDCP data loss rate is a minimum value that satisfies the efficiency threshold.

In an eighth aspect, alone or in combination with one or more of the sixth through seventh aspects, determining the PDCP data loss rate includes minimizing, subject to the efficiency threshold, $$\sum_{i=0}^{l-1}\binom{L}{i}(1-\varepsilon_{PHY})^i(\varepsilon_{PHY})^{L-i} + \sum_{i=l}^{L-1}\binom{L}{i}(1-\varepsilon_{PHY})^i(\varepsilon_{PHY})^{L-i}0.85 \cdot 0.567^{i-l}$$

l includes a number of RLC layer source packets used to generate the plurality of encoded packets, L includes a number of encoded packets in the plurality of encoded packets, and $\varepsilon_{PHY}$ includes the PHY packet error rate.

In a ninth aspect, in combination with the fifth aspect, determining the PDCP coding rate and the PHY coding rate includes determining an efficiency rate associated with receiving the plurality of encoded packets that satisfies a data loss rate threshold.

In a tenth aspect, in combination with the ninth aspect, the efficiency rate is a maximum value that satisfies the data loss rate threshold.

In an eleventh aspect, alone or in combination with one or more of the ninth through tenth aspects, determining the efficiency rate includes maximizing, subject to the data loss rate threshold, $$\frac{1}{\rho} \cdot r_o \cdot r_i$$

$\rho$ includes a decoding threshold associated with the raptor code, $r_o$ includes the PDCP coding rate, and $r_i$ includes the PHY coding rate.

In a twelfth aspect, in combination with the eleventh aspect, determining the efficiency rate includes performing a bisectional search over a finite set of values of the PHY packet error rate.

In a thirteenth aspect, alone or in combination with one or more of the first through twelfth aspects, the PHY packet error rate is determined based on the indication. The indication is included in DCI, a MAC-CE, or a RRC message.

In a fourteenth aspect, in combination with the thirteenth aspect, a value of the PHY packet error rate is within a predetermined finite set of values.

In a fifteenth aspect, alone or in combination with one or more of the thirteenth through fourteenth aspects, the apparatus selects the CQI, the MCS, or both the CQI and the MCS based on the PHY packet error rate and predetermined configuration information stored at the apparatus.

In a sixteenth aspect, in combination with the fifteenth aspect, the predetermined configuration information includes a plurality of tables. Each table of the plurality of tables indicates CQIs and MCSs associated with a respective PHY packet error rate value.

In a seventeenth aspect, alone or in combination with one or more of the first through sixteenth aspects, the apparatus determines the PHY packet error rate based on predetermined configuration information stored at the apparatus and the CQI or the MCS.

In an eighteenth aspect, in combination with the seventeenth aspect, the predetermined configuration information includes a table indicating a plurality of CQIs, a plurality of MCSs, or both a plurality of CQIs and a plurality of MCSs associated with a plurality of PHY packet error rate values.

In some aspects, an apparatus configured for wireless communication, such as a transmitting device, is configured to encode data based on a raptor code to generate a plurality of encoded packets each including at least one respective PHY layer symbol and to initiate transmission, to a receiving device, of the plurality of encoded packets. The apparatus is also configured to determine a SINR associated with transmitting the plurality of encoded packets, to receive a CQI from the receiving device, or to determine a MCS associated with transmitting the plurality of encoded packets. The apparatus is further configured to adaptively determine a PHY packet error rate associated with the plurality of encoded packets based on the SINR, the CQI, or the MCS. In some implementations, the apparatus includes a wireless device, such as a base station. In some other implementations, the apparatus includes a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a nineteenth aspect, the apparatus partitions the data into a plurality of source packets, encodes the plurality of source packets based on the raptor code to generate a plurality of encoded RLC packets, and performs LDPC coding and modulation on the plurality of encoded RLC packets to generate the at least one respective PHY layer symbol of each encoded packet of the plurality of encoded packets.

In a twentieth aspect, in combination with the nineteenth aspect, a number of encoded packets in the plurality of encoded packets is greater than a number of source packets in the plurality of source packets.

In a twenty-first aspect, alone or in combination with one or more of the nineteenth through twentieth aspects, the apparatus includes a base station, and the receiving device includes a UE.

In a twenty-second aspect, alone or in combination with one or more of the nineteenth through twenty-first aspects, the apparatus is not configured to receive feedback information from the receiving device based on transmitting the plurality of encoded packets.

In a twenty-third aspect, alone or in combination with one or more of the nineteenth through twenty-second aspects, the apparatus determines a PDCP coding rate and a PHY coding rate based on the SINR. The PHY packet error rate is determined based on the SINR.

In a twenty-fourth aspect, in combination with the twenty-third aspect, determining the PDCP coding rate and the PHY coding rate includes determining a PDCP data loss rate associated with transmitting the plurality of encoded packets that satisfies an efficiency threshold.

In a twenty-fifth aspect, alone or in combination with one or more of the twenty-third through twenty-fourth aspects, the PDCP data loss rate is a minimum value that satisfies the efficiency threshold.

In a twenty-sixth aspect, alone or in combination with one or more of the twenty-third through twenty-fifth aspects, determining the PDCP data loss rate includes minimizing, subject to the efficiency threshold, $$\sum_{i=0}^{l-1} \binom{L}{i}(1-\varepsilon_{PHY})^i(\varepsilon_{PHY})^{L-i} + \sum_{i=l}^{L-1} \binom{L}{i}(1-\varepsilon_{PHY})^i(\varepsilon_{PHY})^{L-i}0.85 \cdot 0.567^{i-l}$$

l includes a number of source packets used to generate the plurality of encoded packets, L includes a number of encoded packets in the plurality of encoded packets, and $\varepsilon_{PHY}$ includes the PHY packet error rate.

In a twenty-seventh aspect, in combination with the twenty-third aspect, determining the PDCP coding rate and the PHY coding rate includes determining an efficiency rate associated with transmitting the plurality of encoded packets that satisfies a data loss rate threshold.

In a twenty-eighth aspect, in combination with the twenty-seventh aspect, the efficiency rate is a maximum value that satisfies the data loss rate threshold.

In a twenty-ninth aspect, alone or in combination with one or more of the twenty-seventh through twenty-eighth aspects, determining the efficiency rate includes maximizing, subject to the data loss rate threshold, $$\frac{1}{\rho} \cdot r_o \cdot r_i$$

$\rho$ includes a decoding threshold associated with the raptor code, $r_o$ includes the PDCP coding rate, and $r_i$ includes the PHY coding rate.

In a thirtieth aspect, in combination with the twenty-ninth aspect, determining the efficiency rate includes performing a bisectional search over a finite set of values of the PHY packet error rate.

In a thirty-first aspect, alone or in combination with one or more of the nineteenth through thirtieth aspects, the apparatus transmits, to the receiving device, an indication of the PHY packet error rate.

In a thirty-second aspect, in combination with the thirty-first aspect, the indication of the PHY packet error rate is included in DCI, a MAC-CE, or a RRC message.

In a thirty-third aspect, alone or in combination with one or more of the thirty-first through the thirty-second aspects, a value of the PHY packet error rate is within a predetermined finite set of values.

In a thirty-fourth aspect, in combination with the thirty-third aspect, the apparatus selects the CQI, the MCS, or both the CQI and the MCS based on the PHY packet error rate and predetermined configuration information stored at the apparatus.

In a thirty-fifth aspect, in combination with the thirty-fourth aspect, the predetermined configuration information includes a plurality of tables. Each table of the plurality of tables indicates CQIs and MCSs associated with a respective PHY packet error rate value.

In a thirty-sixth aspect, alone or in combination with one or more of the nineteenth through thirty-fifth aspects, the apparatus determines the PHY packet error rate based on predetermined configuration information stored at the apparatus and the CQI or the MCS.

In a thirty-seventh aspect, in combination with the thirty-sixth aspect, the predetermined configuration information includes a table indicating a plurality of CQIs, a plurality of MCSs, or both a plurality of CQIs and a plurality of MCSs associated with a plurality of PHY packet error rate values.

In a thirty-eighth aspect, alone or in combination with one or more of the nineteenth through thirty-seventh aspects, the apparatus receives, from the receiving device, a termination message associated with the plurality of encoded packets and terminates transmission of the plurality of encoded packets based on receipt of the termination message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a receiving device, the method comprising:
   receiving, from a transmitting device, a plurality of encoded packets each including at least one respective physical (PHY) layer symbol;
   decoding the plurality of encoded packets based on a raptor code to generate received data;
   determining a signal-to-interference-plus-noise ratio (SINR) associated with receiving the plurality of encoded packets, receiving an indication from the transmitting device, or determining a channel quality indicator (CQI) or a modulation and coding scheme (MCS) associated with receiving the plurality of encoded packets; and
   adaptively determining a PHY packet error rate associated with the plurality of encoded packets based on the SINR, the indication, the CQI, or the MCS.

2. The method of claim 1, wherein decoding the plurality of encoded packets based on the raptor code comprises:
   performing low density parity check (LDPC) decoding and demodulation on the at least one respective PHY layer symbol of each encoded packet of the plurality of encoded packets to generate a plurality of respective encoded radio link control (RLC) packets; and
   decoding the plurality of encoded RLC packets based on the raptor code.

3. The method of claim 1, wherein a number of encoded packets in the plurality of encoded packets is greater than a number of radio link control (RLC) layer source packets used to encode the plurality of encoded packets.

4. The method of claim 1, wherein the receiving device comprises a user equipment (UE), and wherein the transmitting device comprises a base station.

5. The method of claim 1, further comprising refraining from providing feedback information to the transmitting device based on receiving the plurality of encoded packets.

6. The method of claim 1, further comprising determining a packet data convergence protocol (PDCP) coding rate and a PHY coding rate based on the SINR, wherein the PHY packet error rate is determined based on the SINR.

7. The method of claim 6, wherein determining the PDCP coding rate and the PHY coding rate comprises determining a PDCP data loss rate associated with receiving the plurality of encoded packets that satisfies an efficiency threshold.

8. The method of claim 7, wherein the PDCP data loss rate is a minimum value that satisfies the efficiency threshold.

9. The method of claim 7, wherein determining the PDCP data loss rate comprises minimizing, subject to the efficiency threshold, $$\sum_{i=0}^{l-1}\binom{L}{i}(1-\varepsilon_{PHY})^i(\varepsilon_{PHY})^{L-i} + \sum_{i=l}^{L-1}\binom{L}{i}(1-\varepsilon_{PHY})^i(\varepsilon_{PHY})^{L-i}0.85 \cdot 0.567^{i-l}$$

wherein l comprises a number of radio link control (RLC) layer source packets used to generate the plurality of encoded packets, wherein L comprises a number of encoded packets in the plurality of encoded packets, and wherein $\varepsilon_{PHY}$ comprises the PHY packet error rate.

10. The method of claim 6, wherein determining the PDCP coding rate and the PHY coding rate comprises determining an efficiency rate associated with receiving the plurality of encoded packets that satisfies a data loss rate threshold.

11. The method of claim 10, wherein the efficiency rate is a maximum value that satisfies the data loss rate threshold.

12. The method of claim 10, wherein determining the efficiency rate comprises maximizing, subject to the data loss rate threshold, $$\frac{1}{\rho} \cdot r_o \cdot r_i$$

wherein $\rho$ comprises a decoding threshold associated with the raptor code, wherein $r_o$ comprises the PDCP coding rate, and wherein $r_i$ comprises the PHY coding rate.

13. The method of claim 12, wherein determining the efficiency rate comprises performing a bisectional search over a finite set of values of the PHY packet error rate.

14. The method of claim 1, wherein the PHY packet error rate is determined based on the indication, and wherein the indication is included in downlink control information (DCI), a medium access control control element (MAC-CE), or a radio resource configuration (RRC) message.

15. The method of claim 14, wherein a value of the PHY packet error rate is within a predetermined finite set of values.

16. The method of claim 14, further comprising selecting the CQI, the MCS, or both the CQI and the MCS, based on the PHY packet error rate and predetermined configuration information stored at the receiving device.

17. The method of claim 16, wherein the predetermined configuration information includes a plurality of tables, each table of the plurality of tables indicating CQIs and MCSs associated with a respective PHY packet error rate value.

18. The method of claim 1, further comprising determining the PHY packet error rate based on predetermined configuration information stored at the receiving device and the CQI or the MCS.

19. The method of claim 18, wherein the predetermined configuration information includes a table indicating a plurality of CQIs, a plurality of MCSs, or both a plurality of CQIs and a plurality of MCSs associated with a plurality of PHY packet error rate values.

20. A receiving device comprising:
at least one processor; and
a memory coupled with the at least one processor and storing processor-readable code that, when executed by the at least one processor, is configured to:
receive, from a transmitting device, a plurality of encoded packets each including at least one respective physical (PHY) layer symbol;
decode the plurality of encoded packets based on a raptor code to generate received data;
determine a signal-to-interference-plus-noise ratio (SINR) associated with receiving the plurality of encoded packets, receive an indication from the transmitting device, or determine a channel quality indicator (CQI) or a modulation and coding scheme (MCS) associated with receiving the plurality of encoded packets; and
adaptively determine a PHY packet error rate associated with the plurality of encoded packets based on the SINR, the indication, the CQI, or the MCS.

21. The receiving device of claim 20, wherein the at least one processor is configured to decode the plurality of encoded packets based on the raptor code by:
performing low density parity check (LDPC) decoding and demodulation on the at least one respective PHY layer symbol of each encoded packet of the plurality of encoded packets to generate a plurality of respective encoded radio link control (RLC) packets; and
decoding the plurality of encoded RLC packets based on the raptor code.

22. The receiving device of claim 20, wherein a number of encoded packets in the plurality of encoded packets is greater than a number of radio link control (RLC) layer source packets used to encode the plurality of encoded packets.

23. The receiving device of claim 20, wherein the receiving device comprises a user equipment (UE), and wherein the transmitting device comprises a base station.

24. The receiving device of claim 20, wherein the at least one processor is further configured to refrain from providing feedback information to the transmitting device based on receiving the plurality of encoded packets.

25. The receiving device of claim 20, wherein the at least one processor is further configured to determine a packet data convergence protocol (PDCP) coding rate and a PHY coding rate based on the SINR, and wherein the PHY packet error rate is determined based on the SINR.

26. The receiving device of claim 25, wherein determining the PDCP coding rate and the PHY coding rate comprises determining a PDCP data loss rate associated with receiving the plurality of encoded packets that satisfies an efficiency threshold.

27. The receiving device of claim 26, wherein the PDCP data loss rate is a minimum value that satisfies the efficiency threshold.

28. The receiving device of claim 26, wherein determining the PDCP data loss rate comprises minimizing, subject to the efficiency threshold, $$\sum_{i=0}^{l-1}\binom{L}{i}(1-\varepsilon_{PHY})^i(\varepsilon_{PHY})^{L-i} + \sum_{i=l}^{L-1}\binom{L}{i}(1-\varepsilon_{PHY})^i(\varepsilon_{PHY})^{L-i}0.85 \cdot 0.567^{i-l}$$

wherein l comprises a number of radio link control (RLC) layer source packets used to generate the plurality of encoded packets, wherein L comprises a number of encoded packets in the plurality of encoded packets, and wherein $\varepsilon_{PHY}$ comprises the PHY packet error rate.

29. The receiving device of claim 25, wherein determining the PDCP coding rate and the PHY coding rate comprises determining an efficiency rate associated with receiving the plurality of encoded packets that satisfies a data loss rate threshold.

30. The receiving device of claim 29, wherein the efficiency rate is a maximum value that satisfies the data loss rate threshold.

31. The receiving device of claim 29, wherein determining the efficiency rate comprises maximizing, subject to the data loss rate threshold, $$\frac{1}{\rho} \cdot r_o \cdot r_i$$

wherein $\rho$ comprises a decoding threshold associated with the raptor code, wherein $r_o$ comprises the PDCP coding rate, and wherein $r_i$ comprises the PHY coding rate.

32. The receiving device of claim 31, wherein determining the efficiency rate comprises performing a bisectional search over a finite set of values of the PHY packet error rate.

33. The receiving device of claim 20, wherein the PHY packet error rate is determined based on the indication, and wherein the indication is included in downlink control information (DCI), a medium access control control element (MAC-CE), or a radio resource configuration (RRC) message.

34. The receiving device of claim 33, wherein a value of the PHY packet error rate is within a predetermined finite set of values.

35. The receiving device of claim 33, wherein the at least one processor is further configured to select the CQI, the MCS, or both the CQI and the MCS, based on the PHY packet error rate and predetermined configuration information stored at the receiving device.

36. The receiving device of claim 35, wherein the predetermined configuration information includes a plurality of tables, each table of the plurality of tables indicating CQIs and MCSs associated with a respective PHY packet error rate value.

37. The receiving device of claim 20, wherein the at least one processor is further configured to determine the PHY packet error rate based on predetermined configuration information stored at the receiving device and the CQI or the MCS.

38. The receiving device of claim 37, wherein the predetermined configuration information includes a table indicating a plurality of CQIs, a plurality of MCSs, or both a plurality of CQIs and a plurality of MCSs associated with a plurality of PHY packet error rate values.

39. An apparatus configured for wireless communication, the apparatus comprising:
 means for receiving, from a transmitting device, a plurality of encoded packets each including at least one respective physical (PHY) layer symbol;
 means for decoding the plurality of encoded packets based on a raptor code to generate received data;
 means for determining a signal-to-interference-plus-noise ratio (SINR) associated with receiving the plurality of encoded packets, receiving an indication from the transmitting device, or determining a channel quality indicator (CQI) or a modulation and coding scheme (MCS) associated with receiving the plurality of encoded packets; and
 means for adaptively determining a PHY packet error rate associated with the plurality of encoded packets based on the SINR, the indication, the CQI, or the MCS.

40. A non-transitory computer-readable medium storing instructions that, when executed by a processor, cause the processor to perform operations comprising:
 receiving, from a transmitting device, a plurality of encoded packets each including at least one respective physical (PHY) layer symbol;
 decoding the plurality of encoded packets based on a raptor code to generate received data;
 determining a signal-to-interference-plus-noise ratio (SINR) associated with receiving the plurality of encoded packets, receiving an indication from the transmitting device, or determining a channel quality indicator (CQI) or a modulation and coding scheme (MCS) associated with receiving the plurality of encoded packets; and
 adaptively determining a PHY packet error rate associated with the plurality of encoded packets based on the SINR, the indication, the CQI, or the MCS.

41. A method of wireless communication performed by a transmitting device, the method comprising:
 encoding data based on a raptor code to generate a plurality of encoded packets each including at least one respective physical (PHY) layer symbol;
 transmitting, to a receiving device, the plurality of encoded packets;
 determining a signal-to-interference-plus-noise ratio (SINR) associated with transmitting the plurality of encoded packets, receiving a channel quality indicator (CQI) from the receiving device, or determining a modulation and coding scheme (MCS) associated with transmitting the plurality of encoded packets; and
 adaptively determining a PHY packet error rate associated with the plurality of encoded packets based on the SINR, the CQI, or the MCS.

42. The method of claim 41, wherein encoding the data based on the raptor code comprises:
 partitioning the data into a plurality of source packets;
 encoding the plurality of source packets based on the raptor code to generate a plurality of encoded radio link control (RLC) packets; and
 performing low density parity check (LDPC) coding and modulation on the plurality of encoded RLC packets to generate the at least one respective PHY layer symbol of each encoded packet of the plurality of encoded packets.

43. The method of claim 42, wherein a number of encoded packets in the plurality of encoded packets is greater than a number of source packets in the plurality of source packets.

44. The method of claim 41, wherein the transmitting device comprises a base station, and wherein the receiving device comprises a user equipment (UE).

45. The method of claim 41, wherein the transmitting device is not configured to receive feedback information from the receiving device based on transmitting the plurality of encoded packets.

46. The method of claim 41, further comprising determining a packet data convergence protocol (PDCP) coding rate and a PHY coding rate based on the SINR, wherein the PHY packet error rate is determined based on the SINR.

47. The method of claim 46, wherein determining the PDCP coding rate and the PHY coding rate comprises determining a PDCP data loss rate associated with transmitting the plurality of encoded packets that satisfies an efficiency threshold.

48. The method of claim 47, wherein the PDCP data loss rate is a minimum value that satisfies the efficiency threshold.

49. The method of claim 47, wherein determining the PDCP data loss rate comprises minimizing, subject to the efficiency threshold, $$\sum_{i=0}^{l-1}\binom{L}{i}(1-\varepsilon_{PHY})^i(\varepsilon_{PHY})^{L-i} + \sum_{i=l}^{L-1}\binom{L}{i}(1-\varepsilon_{PHY})^i(\varepsilon_{PHY})^{L-i}0.85 \cdot 0.567^{i-l}$$

wherein l comprises a number of source packets used to generate the plurality of encoded packets, wherein L comprises a number of encoded packets in the plurality of encoded packets, and wherein $\varepsilon_{PHY}$ comprises the PHY packet error rate.

50. The method of claim 46, wherein determining the PDCP coding rate and the PHY coding rate comprises determining an efficiency rate associated with transmitting the plurality of encoded packets that satisfies a data loss rate threshold.

51. The method of claim 50, wherein the efficiency rate is a maximum value that satisfies the data loss rate threshold.

52. The method of claim 50, wherein determining the efficiency rate comprises maximizing, subject to the data loss rate threshold, $$\frac{1}{\rho} \cdot r_o \cdot r_i$$

wherein $\rho$ comprises a decoding threshold associated with the raptor code, wherein $r_o$ comprises the PDCP coding rate, and wherein $r_i$ comprises the PHY coding rate.

53. The method of claim 52, wherein determining the efficiency rate comprises performing a bisectional search over a finite set of values of the PHY packet error rate.

54. The method of claim 41, further comprising transmitting, to the receiving device, an indication of the PHY packet error rate.

55. The method of claim 54, wherein the indication of the PHY packet error rate is included in downlink control information (DCI), a medium access control control element (MAC-CE), or a radio resource configuration (RRC) message.

56. The method of claim 54, wherein a value of the PHY packet error rate is within a predetermined finite set of values.

57. The method of claim 56, further comprising selecting the CQI, the MCS, or both the CQI and the MCS, based on the PHY packet error rate and predetermined configuration information stored at the transmitting device.

58. The method of claim 57, wherein the predetermined configuration information includes a plurality of tables, each table of the plurality of tables indicating CQIs and MCSs associated with a respective PHY packet error rate value.

59. The method of claim 41, further comprising determining the PHY packet error rate based on predetermined configuration information stored at the transmitting device and the CQI or the MCS.

60. The method of claim 59, wherein the predetermined configuration information includes a table indicating a plurality of CQIs, a plurality of MCSs, or both a plurality of CQIs and a plurality of MCSs associated with a plurality of PHY packet error rate values.

61. The method of claim 41, further comprising:
receiving, from the receiving device, a termination message associated with the plurality of encoded packets; and
terminating transmission of the plurality of encoded packets based on receipt of the termination message.

62. A transmitting device comprising:
at least one processor; and
a memory coupled with the at least one processor and storing processor-readable code that, when executed by the at least one processor, is configured to:
encode data based on a raptor code to generate a plurality of encoded packets each including at least one respective physical (PHY) layer symbol;
initiate transmission, to a receiving device, of the plurality of encoded packets;
determine a signal-to-interference-plus-noise ratio (SINR) associated with transmitting the plurality of encoded packets, receive a channel quality indicator (CQI) from the receiving device, or determine a modulation and coding scheme (MCS) associated with transmitting the plurality of encoded packets; and
adaptively determine a PHY packet error rate associated with the plurality of encoded packets based on the SINR, the CQI, or the MCS.

63. The transmitting device of claim 62, wherein encoding the data based on the raptor code comprises:
partitioning the data into a plurality of source packets;
encoding the plurality of source packets based on the raptor code to generate a plurality of encoded radio link control (RLC) packets; and
performing low density parity check (LDPC) coding and modulation on the plurality of encoded RLC packets to generate the at least one respective PHY layer symbol of each encoded packet of the plurality of encoded packets.

64. The transmitting device of claim 63, wherein a number of encoded packets in the plurality of encoded packets is greater than a number of source packets in the plurality of source packets.

65. The transmitting device of claim 62, wherein the transmitting device comprises a base station, and wherein the receiving device comprises a user equipment (UE).

66. The transmitting device of claim 62, wherein the transmitting device is not configured to receive feedback information from the receiving device based on transmitting the plurality of encoded packets.

67. The transmitting device of claim 62, wherein the at least one processor is further configured to determine a packet data convergence protocol (PDCP) coding rate and a PHY coding rate based on the SINR, and wherein the PHY packet error rate is determined based on the SINR.

68. The transmitting device of claim 67, wherein determining the PDCP coding rate and the PHY coding rate comprises determining a PDCP data loss rate associated with transmitting the plurality of encoded packets that satisfies an efficiency threshold.

69. The transmitting device of claim 68, wherein the PDCP data loss rate is a minimum value that satisfies the efficiency threshold.

70. The transmitting device of claim 68, wherein determining the PDCP data loss rate comprises minimizing, subject to the efficiency threshold, $$\sum_{i=0}^{l-1}\binom{L}{i}(1-\varepsilon_{PHY})^i(\varepsilon_{PHY})^{L-i} + \sum_{i=l}^{L-1}\binom{L}{i}(1-\varepsilon_{PHY})^i(\varepsilon_{PHY})^{L-i}0.85 \cdot 0.567^{i-l}$$

wherein l comprises a number of source packets used to generate the plurality of encoded packets, wherein L comprises a number of encoded packets in the plurality of encoded packets, and wherein $\varepsilon_{PHY}$ comprises the PHY packet error rate.

71. The transmitting device of claim 67, wherein determining the PDCP coding rate and the PHY coding rate comprises determining an efficiency rate associated with transmitting the plurality of encoded packets that satisfies a data loss rate threshold.

72. The transmitting device of claim 71, wherein the efficiency rate is a maximum value that satisfies the data loss rate threshold.

73. The transmitting device of claim 71, wherein determining the efficiency rate comprises maximizing, subject to the data loss rate threshold, $$\frac{1}{\rho} \cdot r_o \cdot r_i$$

wherein $\rho$ comprises a decoding threshold associated with the raptor code, wherein $r_o$ comprises the PDCP coding rate, and wherein $r_i$ comprises the PHY coding rate.

74. The transmitting device of claim 73, wherein determining the efficiency rate comprises performing a bisectional search over a finite set of values of the PHY packet error rate.

75. The transmitting device of claim 62, wherein the at least one processor is further configured to initiate transmission, to the receiving device, of an indication of the PHY packet error rate.

76. The transmitting device of claim 75, wherein the indication of the PHY packet error rate is included in downlink control information (DCI), a medium access control control element (MAC-CE), or a radio resource configuration (RRC) message.

77. The transmitting device of claim 75, wherein a value of the PHY packet error rate is within a predetermined finite set of values.

78. The transmitting device of claim 77, wherein the at least one processor is further configured to select the CQI, the MCS, or both the CQI and the MCS, based on the PHY packet error rate and predetermined configuration information stored at the transmitting device.

79. The transmitting device of claim 78, wherein the predetermined configuration information includes a plurality of tables, each table of the plurality of tables indicating CQIs and MCSs associated with a respective PHY packet error rate value.

80. The transmitting device of claim 62, wherein the at least one processor is further configured to determine the PHY packet error rate based on predetermined configuration information stored at the transmitting device and the CQI or the MCS.

81. The transmitting device of claim 80, wherein the predetermined configuration information includes a table indicating a plurality of CQIs, a plurality of MCSs, or both a plurality of CQIs and a plurality of MCSs associated with a plurality of PHY packet error rate values.

82. The transmitting device of claim 62, wherein that at least one processor is further configured to:
  receive, from the receiving device, a termination message associated with the plurality of encoded packets; and
  terminate transmission of the plurality of encoded packets based on receipt of the termination message.

83. An apparatus configured for wireless communication, the apparatus comprising:
  means for encoding data based on a raptor code to generate a plurality of encoded packets each including at least one respective physical (PHY) layer symbol;
  means for transmitting, to a receiving device, the plurality of encoded packets;
  means for determining a signal-to-interference-plus-noise ratio (SINR) associated with transmitting the plurality of encoded packets, receiving a channel quality indicator (CQI) from the receiving device, or determining a modulation and coding scheme (MCS) associated with transmitting the plurality of encoded packets; and
  means for adaptively determining a PHY packet error rate associated with the plurality of encoded packets based on the SINR, the CQI, or the MCS.

84. A non-transitory computer-readable medium storing instructions that, when executed by a processor, cause the processor to perform operations comprising:
  encoding data based on a raptor code to generate a plurality of encoded packets each including at least one respective physical (PHY) layer symbol;
  initiating transmission, to a receiving device, of the plurality of encoded packets;
  determining a signal-to-interference-plus-noise ratio (SINR) associated with transmitting the plurality of encoded packets, receiving a channel quality indicator (CQI) from the receiving device, or determining a modulation and coding scheme (MCS) associated with transmitting the plurality of encoded packets; and
  adaptively determining a PHY packet error rate associated with the plurality of encoded packets based on the SINR, the CQI, or the MCS.

* * * * *